US011828660B2

(12) United States Patent
Patel

(10) Patent No.: US 11,828,660 B2
(45) Date of Patent: Nov. 28, 2023

(54) UV CURED INDICATING DEVICES

(71) Applicant: JP Laboratories, Inc., Middlesex, NJ (US)

(72) Inventor: Gordhanbhai N Patel, Middlesex, NJ (US)

(73) Assignee: JP Laboratories, Inc., Middlesex, NJ (US)

( * ) Notice: Subject to any disclaimer, the term of this patent is extended or adjusted under 35 U.S.C. 154(b) by 1687 days.

(21) Appl. No.: 15/573,831

(22) PCT Filed: May 10, 2016

(86) PCT No.: PCT/US2016/031554
§ 371 (c)(1),
(2) Date: Nov. 13, 2017

(87) PCT Pub. No.: WO2016/183044
PCT Pub. Date: Nov. 17, 2016

(65) Prior Publication Data
US 2018/0259403 A1 Sep. 13, 2018

Related U.S. Application Data

(60) Provisional application No. 62/169,019, filed on Jun. 1, 2015, provisional application No. 62/159,306, filed on May 10, 2015.

(51) Int. Cl.
*G01K 11/18* (2006.01)
*G04F 1/02* (2006.01)
(Continued)

(52) U.S. Cl.
CPC .............. *G01K 11/18* (2013.01); *G01K 11/12* (2013.01); *G01N 31/229* (2013.01); *G04F 1/02* (2013.01)

(58) Field of Classification Search
CPC ...... G01K 11/18; G01K 11/12; G01N 31/229; G04F 1/02
See application file for complete search history.

(56) References Cited

U.S. PATENT DOCUMENTS 4,228,126 A * 10/1980 Patel ................... G01K 3/04
436/2
5,053,339 A * 10/1991 Patel ................... G01K 3/04
116/206
(Continued)

FOREIGN PATENT DOCUMENTS

WO 2008083926 A1 † 7/2008
WO 2009156285 A1 † 12/2009
WO 2013186782 A1 † 12/2013

OTHER PUBLICATIONS

IPR2017-00538 "Judgment and Final Decision, Granting Request for Adverse Judgment After Institution of Trial, 35 U.S.C. 318(a); 37 C.F.R. 42.73(b)" Nov. 3, 2017.†
(Continued)

*Primary Examiner* — John Fitzgerald
*Assistant Examiner* — Tania Courson
(74) *Attorney, Agent, or Firm* — Joseph T. Guy; Patent Filing Specialist Inc.

(57) ABSTRACT

This invention relates to thin indicating devices, such as time-temperature indicators and a method of making by applying and UV curing one or more layers of indicating composition are disclosed. For example, an indicator layer is applied on substrate and cured with UV light, immediately followed by an application of an activator layer which is cured by UV light. The device can have other layers, such as a permeable barrier between the activator and indicator layer and a top protective layers which are also UV cured.
(Continued)

This fast curing method prevents premature reactions, e.g., diffusion of activator into indicator layer and vice versa during manufacturing.

15 Claims, 7 Drawing Sheets

(51) Int. Cl.
  *G01N 31/22* (2006.01)
  *G01K 11/12* (2021.01)

(56) References Cited

U.S. PATENT DOCUMENTS

| | | | | |
|---|---|---|---|---|
| 5,254,473 | A * | 10/1993 | Patel | G01N 31/229 436/1 |
| 5,420,000 | A * | 5/1995 | Patel | G03F 7/025 430/374 |
| 5,672,465 | A * | 9/1997 | Patel | G03C 1/73 430/374 |
| 6,787,013 | B2 * | 9/2004 | Chang | C12Q 1/001 29/830 |
| 7,072,248 | B2 * | 7/2006 | Gohil | C08K 7/00 374/102 |
| 7,294,379 | B2 * | 11/2007 | Ko | G01K 3/04 368/327 |
| 7,476,874 | B2 * | 1/2009 | Patel | G01T 1/04 250/484.5 |
| 7,653,492 | B2 * | 1/2010 | Davies | A61B 5/150022 702/22 |
| 7,791,984 | B2 * | 9/2010 | Su | G01N 31/229 368/327 |
| 7,974,157 | B2 * | 7/2011 | Su | G01N 31/229 368/327 |
| 8,088,479 | B2 * | 1/2012 | Su | G01N 31/229 428/339 |
| 8,115,182 | B1 * | 2/2012 | Patel | G01T 1/06 250/484.5 |
| 8,343,437 | B2 † | 1/2013 | Patel | |
| 8,529,682 | B2 * | 9/2013 | Prusik | C09D 11/50 374/102 |
| 8,968,662 | B2 * | 3/2015 | Haarer | G01K 3/04 422/82.01 |
| 9,011,794 | B2 * | 4/2015 | Haarer | G01K 3/04 422/425 |
| 9,448,182 | B2 * | 9/2016 | Haarer | G01K 3/04 |
| 9,792,838 | B2 * | 10/2017 | Martin | G09F 3/0291 |
| 10,186,174 | B2 * | 1/2019 | Martin | G01N 27/06 |
| 10,260,956 | B2 * | 4/2019 | Salman | G01K 3/04 |
| 10,451,595 | B2 * | 10/2019 | Patel | G01N 31/229 |
| 10,514,340 | B2 * | 12/2019 | Prusik | G01N 21/78 |
| 11,071,795 | B2 * | 7/2021 | Patel | A61L 2/07 |
| 11,511,479 | B2 * | 11/2022 | Hartman | B29C 64/205 |
| 2009/0301382 | A1 * | 12/2009 | Patel | G01D 3/10 116/201 |
| 2010/0043694 | A1 * | 2/2010 | Patel | G09F 3/0341 156/60 |
| 2010/0296545 | A1 * | 11/2010 | Haarer | G01K 3/04 374/102 |
| 2011/0155043 | A1 * | 6/2011 | Haarer | G01K 3/04 156/280 |
| 2012/0236900 | A1 * | 9/2012 | Hubbard | G01K 3/04 374/102 |
| 2014/0044609 | A1 * | 2/2014 | Prusik | G01N 31/229 422/429 |
| 2014/0154808 | A1 * | 6/2014 | Patel | A61L 2/206 436/1 |
| 2022/0017719 | A1 * | 1/2022 | Jurewicz | C08K 3/30 |

OTHER PUBLICATIONS

Petition for Inter Partes Review of U.S. Pat. No. 8,343,437, filed Dec. 23, 2016.†
IPR2017-00538 "Decision, Institution of Inter Partes Review, 37 C.F.R. 42.108" Jul. 12, 2017.†

\* cited by examiner
† cited by third party

UV CURED INDICATING DEVICES

CROSS-REFERENCE TO RELATED APPLICATIONS

This application claims priority to U.S. Provisional Patent Application Nos. 62/159,306, filed May 10, 2015 and 62/169,019, filed Jun. 1, 2015, which are incorporated herein by reference in their entireties.

FIELD OF THE INVENTION

The present invention relates to a method of making indicating devices, such as time-temperature indicators by applying and UV curing one or more layers of the devices.

BACKGROUND OF INVENTION

Perishable products have measurable shelf-lives, which are usually expressed within specified limits as the time left for available end use. The term "perishable(s)" or "perishable product(s)" is meant herein to include perishable foods, such as fresh, refrigerated, and frozen, vegetables, fruits, meats, fish, poultry, dairy products, bakery products, juices, pre-cooked foods, soft and alcoholic beverages, and also including nonfood items having shelf lives ranging from a few hours to several years including pharmaceuticals, vaccines, sera, blood, blood plasma, cosmetics, reactive chemical compounds, bio-chemicals, bio-products, and batteries which have a measurable shelf life. In order to monitor their shelf lives, there is a need for an indicator.

Time-temperature indicator(s) (TTI) devices provide a way of indicating a cumulative exposure to time and temperature and can be used for monitoring shelf lives of perishables. A TTI device may be capable of indicating whether a commodity has been exposed to a temperature greater than a predetermined temperature for a period of time or to an integral value of time and temperature. For example, a TTI device might indicate exposure to an excessive temperature for an excessive period of time or both. A large number of time-temperature indicating devices and time indicating devices for monitoring thermal degradation of perishables and self-expiring labels, tickets and badges have been reported in patent literature. Many of these devices are based on diffusion of a chemical in media or from one layer to the other, sometimes through a permeable layer, to introduce a change, e.g., color or conductivity change in the indicator layer. The other TTIs are based on chemical reactions, such as the solid state polymerization of diacetylenes, change in pH and change in photochromism and thermochromism are also reported.

A wide variety of medical supplies and other items are sterilized with materials and techniques, such as steam, dry heat, ethylene oxide, hydrogen peroxide, plasma, peracetic acid, formaldehyde and high-energy radiation. Kitchenware, such as dishes, cutlery, and utensils used at home and restaurants are also sterilized in dishwashers with hot water and hot air usually around 90° C. It is essential to assure that these items are sterilized or meet required specifications. A number of sterilization indicating devices, dosimeters and monitors are proposed in the literature. They include biological and chemical indicating devices. The color changing chemical indicating devices are inexpensive and are widely used.

A large number of devices for monitoring time and integral value of time and temperature are reported in the literature. Most of them are multi-layer. Most of the indicators have at least two layers, an activator layer and an indicator layer. As activator and indicator are fast reacting, they cannot be applied and dried one over the other from solution or hot melt. Patel in U.S. Pat. No. 5,053,339 disclosed a diffusion based two tape device for monitoring the time-temperature storage history, i.e. shelf life of perishable products. The device is composed of (1) an activator tape, containing an activator composition and matrix on a substrate, (2) an indicator tape, containing an indicating composition and matrix on a substrate and (3) an optional permeable layer between them. The permeable layer is often referred to as a barrier layer in the prior art. The device is activated by applying the activator tape over the indicator tape. This and similar devices in general are often referred herein to as two-tape devices, two-tape TTI. These two tape devices are thicker as they use two substrates.

Haas and his co-inventors in a series of U.S. Pat. Nos. 4,903,254; 5,053,339; 5,446,705; 5,602,804; 5,633,835; 5,699,326; 5,715,215; 5,719,828; 5,785,354; 5,822,280; 5,862,101; 5,873,606; 5,930,206; 6,446,865; 6,452,873; 6,752,430; 7,139,226; and 7,263,037 have disclosed time monitoring devices and related processes. All these patents are hereby incorporated by reference into the specification of this application. These devices are also based on diffusion of an activator (which also includes a dye) through a medium. The indicator has a matrix, e.g., an ink which has a binder.

Many other multi-layer indicating devices are reported in the literature. In these multi-layer indicating devices, typically one layer is applied on a substrate, dried followed by application of another layer and dried. Indicating devices having one UV curable layer are also reported. The following are some representative examples:

U.S. Pat. No. 7,198,834 discloses an optical recording medium, comprises a substrate, and an imaging medium disposed on the substrate, the imaging medium comprising: a marking layer including a thermochromic compound and an interference layer tuned to absorb light having a predetermined wavelength using cationic photo polymerization resins.

U.S. Pat. No. 7,306,764 discloses a wetness indicator in which the wetness indicator layer is UV cured.

U.S. Pat. No. 7,754,273 discloses a method of printing a substrate comprising printing onto the substrate at least one time temperature indicator with chromic properties based on an azo coupling reaction between a capped diazonium component and a coupling component.

U.S. Pat. No. 7,791,984 discloses an apparatus which comprises a substrate, a background layer on the substrate, and a time passage indicating layer on the background layer. The protective layer is UV cured.

U.S. Pat. No. 7,294,379 discloses a two tape TTI devices wherein a varnish can be UV curable.

US Patent Application No. 20120236900 discloses printed elapsed time-temperature indicating labels wherein one layer or pattern can be UV cured.

Multi-layer color printing in which all layers composed of UV curable ink and cured by UV light is widely used today. However, in color printing, any two adjacent layers do not react.

Typically, activator and indicator, especially for time-temperature indicators react rapidly and hence it is not possible to mix them together and apply and dry on substrate. Making multilayer indicating devices by applying a layer (e.g., that of indicator) followed by drying and applying another layer (e.g., that of activator) followed by drying is expensive and not practical. When the layers are liquids, diffusion of activator and/or indicator is very fast. It is very difficult to apply one layer, dry it and then apply another layer, dry it by conventional heat drying method, without their diffusion and reaction. Indicating devices can be made by creating one layer over the other from hot melt but high temperature causes increase in diffusion of the ingredients.

Single layer indicators containing more than one reactants in one layer are reported in the literature for many devices other than time, time-temperature and threshold time-temperature indicators. Sterilization indicators, such as steam sterilization indicators usually contain more than one components or reactants in a single layer because the reactants don't react during manufacturing. Single layer temperature indicators composed of one or more reactants are also reported but they are not time-temperature or time indicator. The temperature indicator undergo a color change only at a predetermined higher temperature. Single layer indicator containing more than one reactant which react with external reactant or stimulant such as steam, humidity, oxygen, radiation or chemicals are also reported. However, these devices require external stimulant such as steam, humidity, oxygen, chemicals or radiation.

A number of TTI devices based on reaction of two chemicals such as an activator and indicator are reported. However, in order to prevent the premature reaction, the activator and indicator are in two different layers and kept apart till activated, e.g., by lamination, when required. Because the reactants are usually start reacting when they are mixed, it is not possible to mix activator and indicator in a medium, coat and dry to make a single layer TTI. There is no report, on single layer TI, TTI, microwave doneness and thaw (or threshold time-temperature) indicators in which all reactants and adjuvants are in one layer.

Typically, the activator and indicator of a TTI react rapidly in the ink/coating formulation and/or they react during drying of the coating and hence it is not possible to mix them together and make the TTI devices. When the layers are liquids, the diffusion of an activator and/or indicator is very fast, and premature reaction or color development occurs.

Thus there remains a need for indicators that are produced by methods that are fast and economical and do not have the same issues of diffusion and reaction.

OBJECTIVES OF THE INVENTION

The main objective of the instant invention is to develop a fast and economical method of manufacturing multilayer indicating devices, such as time, temperature, time-temperature, food doneness, freeze, thaw, humidity, oxygen and sterilization by applying and curing different layers one layer after the other with high energy ionizing radiation, such as UV light.

Another objective is to make TTI devices having an indicator, permeable, activator and protective layers on one manufacturing line by UV curing method.

Yet another objective is to make one composite indicating devices by UV curing method.

Another objective is to apply and UV cure additional layers, such as barrier layer and message layer between the substrate and top protective layer.

Another main objective is to develop a very economical, easy and versatile method of manufacturing indicating devices, such as time, time-temperature, food doneness and thaw indicators based on the diffusion of at least one reactant in a single layer containing two or more reactants and other adjuvants in a polymeric binder.

Another objective is to make a formulation composed of fine dispersion of solid reactants and additives in a vehicle/ink, mix, coat, dry or UV cure the binder to make a layer of TTI on a substrate.

Yet another objective is to make single layer indicating devices which are not significantly dependent on concentration of ingredients.

Yet another objective is to make single layer indicating devices which are not significantly dependent on the thickness of the indicating layer.

BRIEF SUMMARY OF THE INVENTION

This invention relates to new indicating systems which can be produced quickly and efficiently by placing the active agents, such an indicator and an activator in one or more layers of binder which can be cured quickly by UV light.

Thus, in one embodiment, this invention relates to making multi-layer devices without premature reaction and loss of shelf life or service life by using UV curing binders and curing the layers with UV light. The UV light cures the binders in seconds and there is very little heating. Further, any two adjacent reactive layers composed of UV curing materials can then be in direct contact with each other and cured by UV light. The multilayer device is constructed by applying and UV curing one layer after the other.

In an another embodiment, a single layer TTI can be made without premature reaction and loss of shelf life or service life by mixing two solid reactants in a media in which they are not soluble and hence little or no reaction between them occurs before coated and UV cured.

More particularly, one embodiment of this invention relates to a method of making a time-temperature indicating device by (i) applying an indicator layer comprised of at least one UV light curable binder and at least one indicator to a substrate; (ii) curing the indicator layer with UV light; (iii) applying an activator layer comprised of at least one UV curable binder and at least one activator to the indicator layer; (iv) curing the activator layer with UV light; (v) applying a UV curable protective layer; and (vi) UV curing the protective layer. Alternatively, the activator layer can be applied to a substrate and cured prior to the application of the indicator layer.

In a more particular embodiment a permeable barrier layer can be applied between the indicator layer and the activator layer.

Another embodiment of the invention relates to time-temperature indicating device comprised of a substrate having thereon (i) an indicator layer comprised of at least one UV cured binder and at least one indicator; (ii) an activator layer comprised of at least one UV cured binder and at least one activator; and (iii) a protective layer.

Further, the device can have a UV cured permeable layer between the indicator layer and the activator layer.

In a more particular embodiment, there can be at least one controller that controls the reaction between the indicator and the activator in one of the layers.

The time required for a color change or service life of the indicator can be varied by one or more parameters selected from thickness of the binder, thickness of the permeable layer, concentration of the activator, concentration of the indicator and concentration of a controller. Further, the activation energy of the devices can be varied by varying one or more parameters selected from nature of the binder, nature of the activator, nature of the indicator, nature of a controller and nature of the permeable layer.

Another embodiment of the invention relates to a single layer indicating device which is an indicator ink composition comprising a UV curable binder having solid particles of an indicator and solid particles of an activator. The ink composition may further comprise a controller.

Yet another embodiment relates to a water or solvent based indicator ink composition comprising a binder comprising solid particles of an indicator and solid particles of an activator. The composition can also contain a controller.

Another embodiment of the invention relates to a time-temperature indicating device comprising a substrate having thereon a UV cured binder layer comprising solid particles of an indicator, solid particles of an activator and a controller and a UV cured protective layer on the top. Another embodiment of the invention relates to a time-temperature indicating device comprising a substrate having thereon a binder layer comprising solid particles of an indicator, solid particles of an activator and a controller and a protective layer on the top. The time required for a color change or service life for either device can be varied by one or more parameters selected from thickness of the binder, concentration of the activator, concentration of the indicator and concentration of a controller.

In another embodiment, the activation energy of either the single layer or the multilayer devices is varied by varying one or more parameters selected from nature of the binder, nature of the activator, nature of the indicator and nature of a controller.

BRIEF DESCRIPTION OF THE FIGURES

So that those having ordinary skill in the art will have a better understanding of how to make and use the invention, reference is made to the accompanying figures wherein:

FIG. 3A shows a top view and FIG. 3B shows a side view of the device.

DETAILED DESCRIPTION OF THE INVENTION

Figure 1:
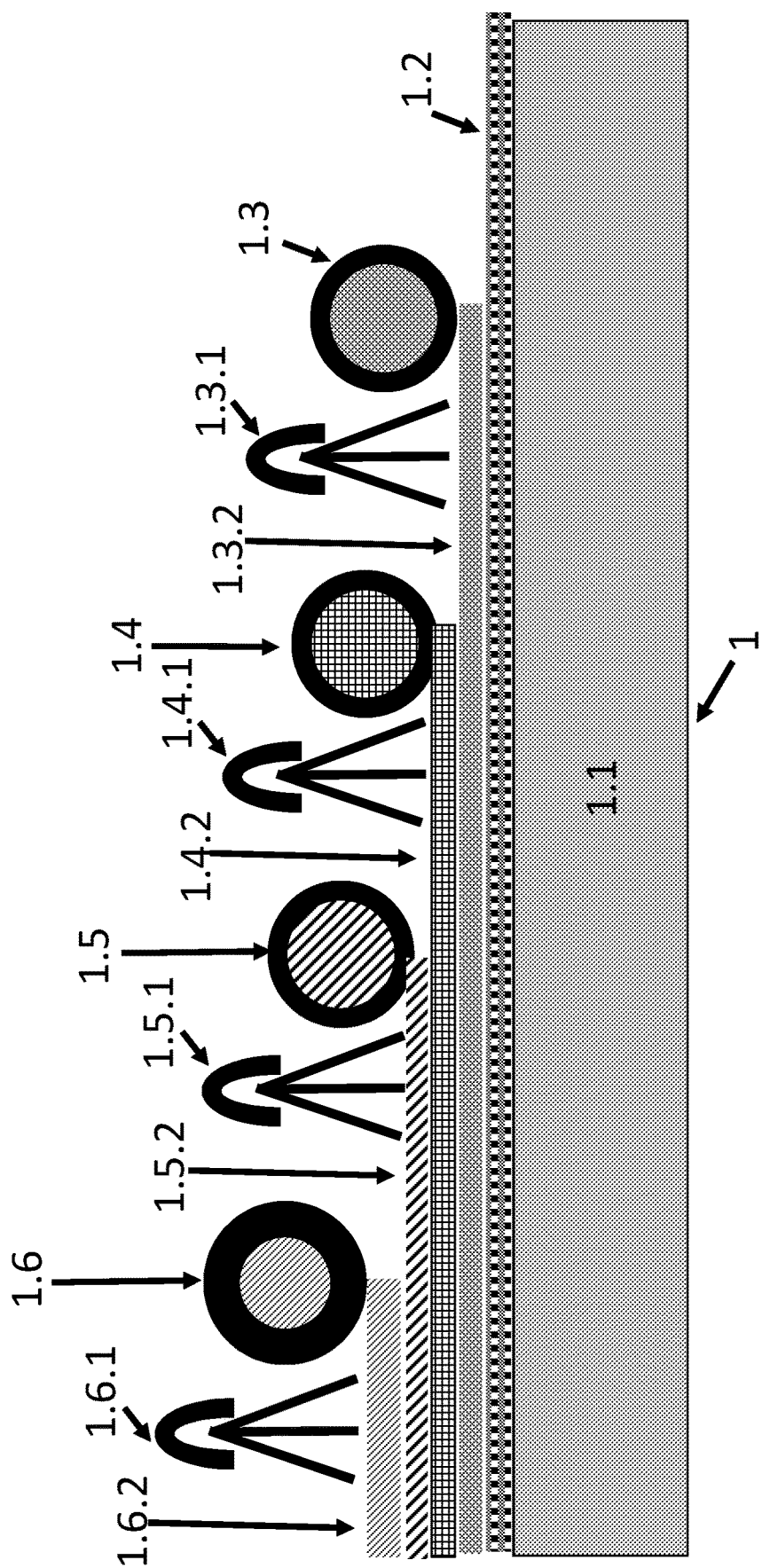
FIG. 1 is a cross sectional schematic presentation of some basic steps and layers of a multilayer UV curing indicating system.

The following definitions are useful in describing the instant invention:

Accelerator: A material which can increase the diffusion of an ingredient of the device.

Activator: A material which when reacts with an indicator develops a noticeable or measurable change, e.g., color, fluorescence, transparency and conductivity.

Controller: A material which controls reactions, increases or decreases the diffusion of an ingredient of the device. The controller, for example, can be an additive, such as a plasticizer, oligomer, solvent, neutralizer, accelerator or a compound which increases diffusion of an ingredient or reactivity of the reactants. Controller is often referred to as an additive.

Diffusion: A process of migration of an ingredient, especially a reactant of the device. The words diffusion, permeation, movement or migration are used interchangeably herein.

Indicating devices: Indicating devices include indicators, such as time (TI), time-temperature (TTI), thaw, freeze, humidity, ionizing radiation, temperature, microwave, sterilization (SI) (including that with steam, ethylene oxide, plasma, formaldehyde, dry heat, hydrogen peroxide and peracetic acid), chemicals, biological and chemical agents, microwave and similar indicating devices, individually or collectively are often referred herein to as indicating device(s), indicating system(s) or simply as a device or system. An indicating device or indicating system also includes other formulations, devices and processes disclosed herein. We have also used the word integrator, integrating device, sensor, detector and monitor and monitoring devices interchangeably with indicating device and indicating system.

Indicating device layer or indicating layer: A layer composed to a UV curable or cured formulation includes an indicator layer, activator layer, barrier layer and protective layer.

Indicator: A material or device which undergoes a noticeable or measurable change, e.g., color, fluorescence, transparency and conductivity.

Multilayer indicating device: An indicating device in which there are more than one layers, such as indicator layer, activator layer and permeable layer. These layers are usually sandwiched between a substrate and a protective layer.

Service life: It is the maximum usable time the indicating device can be used at a given temperature.

Shelf life: It is the storage time of the indicating device during which service life is not meaningfully affected before it is applied on an object or used.

Single layer indicating device: An indicating device in which almost all key ingredients of the device are contained in one layer only. The single layer is usually sandwiched between a substrate and a protective layer.

TTI: Time-temperature indicating device, which undergoes a change, such as color, opacity, fluorescence, conductivity and alike with time and temperature.

UV ink: An ink formulation composed of polymerizable or crosslinkable monomer, oligomer and/or polymer, with or without any active or inert ingredients, such as activator or indicator, which can be cured, polymerized and or crosslinked by high energy radiation, such as visible light, UV light (short and long), X-ray and electrons having wavelength of 700 nm to 10 picometer.

UV curing or UV method: A process of polymerization and/or crosslinking of monomer, oligomer or polymer by radiation, such as visible light, UV light (short and long), energy from 700 nm to 10 picometer.

UV layer, UV curable layer or UV cured layer: A layer of UV ink which may be cured or cured with high energy radiation.

The above definitions are of broad and of general nature and not specific.

This invention relates to new indicating systems which can be produced quickly and efficiently. The indicating systems are produced by placing the active agents in the indicator in one or more layers of binder which can be cured quickly by UV light.

Thus, in one embodiment, this invention relates to making multi-layer devices without premature reaction and loss of shelf life or service life by using UV curing binders and curing the layers with UV light. The UV light cures the binders in seconds and there is very little heating. Further, any two adjacent reactive layers composed of UV curing materials can then be in direct contact with each other and cured by UV light. The multilayer device is constructed by applying and UV curing one layer after the other.

In an another embodiment, a single layer TTI can be made without premature reaction and loss of shelf life or service life by mixing two solid reactants in a media in which they are not soluble and hence little or no reaction between them occurs before coated and UV cured.

A schematic presentation of some basic layers and UV curing of the current device is given in FIG. 1. As shown in FIG. 1, the basic device 1 is composed of a (i) substrate 1.1, (ii) an indicator layer 1.3.2 composed of an indicator in a UV cured binder, (iii) an optional UV cured permeable barrier layer 1.4.2 and (iv) an activator layer 1.5.2 composed of an activator in a UV cured activator binder and (v) a UV cured protective layer or another substrate 1.6.2. The protective layer and the substrate are highly impermeable to ingredients of the devices.

The indicating system can be made by applying the first UV curable layer 1.3.2, e.g., that of an indicator on a substrate 1.1 with an ink coater 1.3 and cured with a UV lamp 1.3.1. The substrate 1.1 may have a pre-coat 1.2. The pre-coat 1.2 may be an opaque white layer, a metal layer or any optional layer. If the substrate has a metal layer as an indicator layer (e.g., a metallized plastic film or a plastic film coated with an ink containing metal particles, there will be no need for the UV cured indicator layer 1.3.2. The substrate may have a PSA (pressure sensitive adhesive) layer with a release liner on backside (not shown). After the UV curing of the layer 1.3.2, UV curable layer 1.4.2 is applied with an ink coater 1.4 followed by UV curing with a UV lamp 1.4.1. Layer 1.4.2 also can be any layer, e.g., a permeable barrier layer. After the UV curing of the layer 1.4.2, UV curable layer 1.5.2 e.g., that of an activator is applied with an ink coater 1.5 followed by UV curing with a UV lamp 1.5.1. In order to protect the device from ambient conditions, UV cured layers are either laminated with a high barrier film or a UV cured layer. A UV curable high barrier layer 1.6.2 is applied with a coater 1.6 followed by UV curing with a UV lamp 1.6.1. Other required layers are made in a similar manner. As UV curing is fast (usually a few seconds in a real production) and least heat producing, the TTI and other devices can be made without the diffusion of the ingredients. The position of the activator layer (1.5.2) can be interchanged with the indicator layer (1.3.2). The permeable layer 1.4.2 can be in form a wedge to create a moving boundary indicating system.

Figure 2:
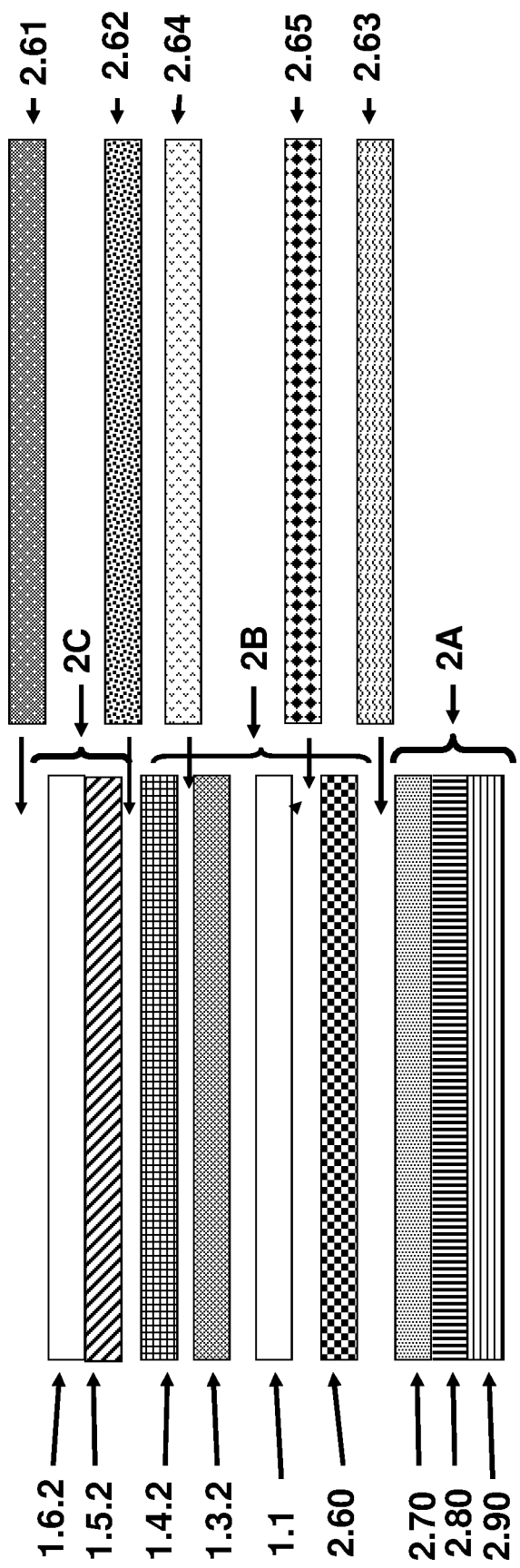
FIG. 2 is a cross sectional schematic presentation of different layers of the UV curing indicating system.

A schematic presentation of some basic and optional layers of the current device is shown in FIG. 2. The device has four basic layer systems, (i) an application system A under a substrate 1.1 to apply the indicating system on a container of a perishables, (ii) an indicator system B on a substrate 1.1, (iii) an activator layer system C on the indicator layer system B and (iv) a system of optional layers. These layers can have any color, shape, thickness, size and nature as desired. They all or some of them can be cured with UV light. The position of these layers relative to one another can often be changed and can often be interchanged. Most of these layers could be whole, partial or discontinuous. Some of these layers could be in form of a pattern, message or image.

In order to store and apply devices disclosed herein on an object, the basic device can have a storage tape 2A composed of a pressure sensitive adhesive (PSA) layer 2.70, a release layer 2.80 and a release liner 2.90. The device is applied on to an object by removing the release liner 2.90 and the release layer 2.80.

The device can have many optional layers, for example, 2.60-2.65. The expiration indicating layer 2.60 is highly desirable but not essential. The expiration indicating layer is a layer which becomes visible when the indicator layer is opaque and becomes transparent with treatment, such as time and temperature. The expiration layer 2.60 can also be on either side of the substrate 1.1. The permeable layer 1.42 can be used to increase an induction period of the reaction, vary time required for the color or transparency change and vary the activation energy of the system. The indicator layer 1.3.2 can also be a nano thick metal with a naturally formed oxide layer (e.g., that of a metallized plastic film). The activator is in activator layer 1.52 with a protective layer 1.62.

The device could have many additional optional layers, e.g., top message layer 2.61, activation indictor layer 2.62, tamper indicator layer 2.63 and reaction mask layer 2.64, if desired or required. The optional layers 2.60-2.65 provide additional colors, desired effects, messages, images and indications. The nature and transparency of these different layers of the device will depend upon the application of the device. For example, the substrates for most of the applications will be a transparent and/or clear plastic film. However, for certain applications, they can be opaque, semitransparent, colored or having a message or image printed on the substrate. There are many other optional layers which can be added in the device. It is also possible to have more than one of the same layer in a device, e.g., two activator layers, two indicators and two barrier layers. These layers may have their own UV curable/cured binder and additives. These optional layers may be composed of a microencapsulated material.

Figure 3:
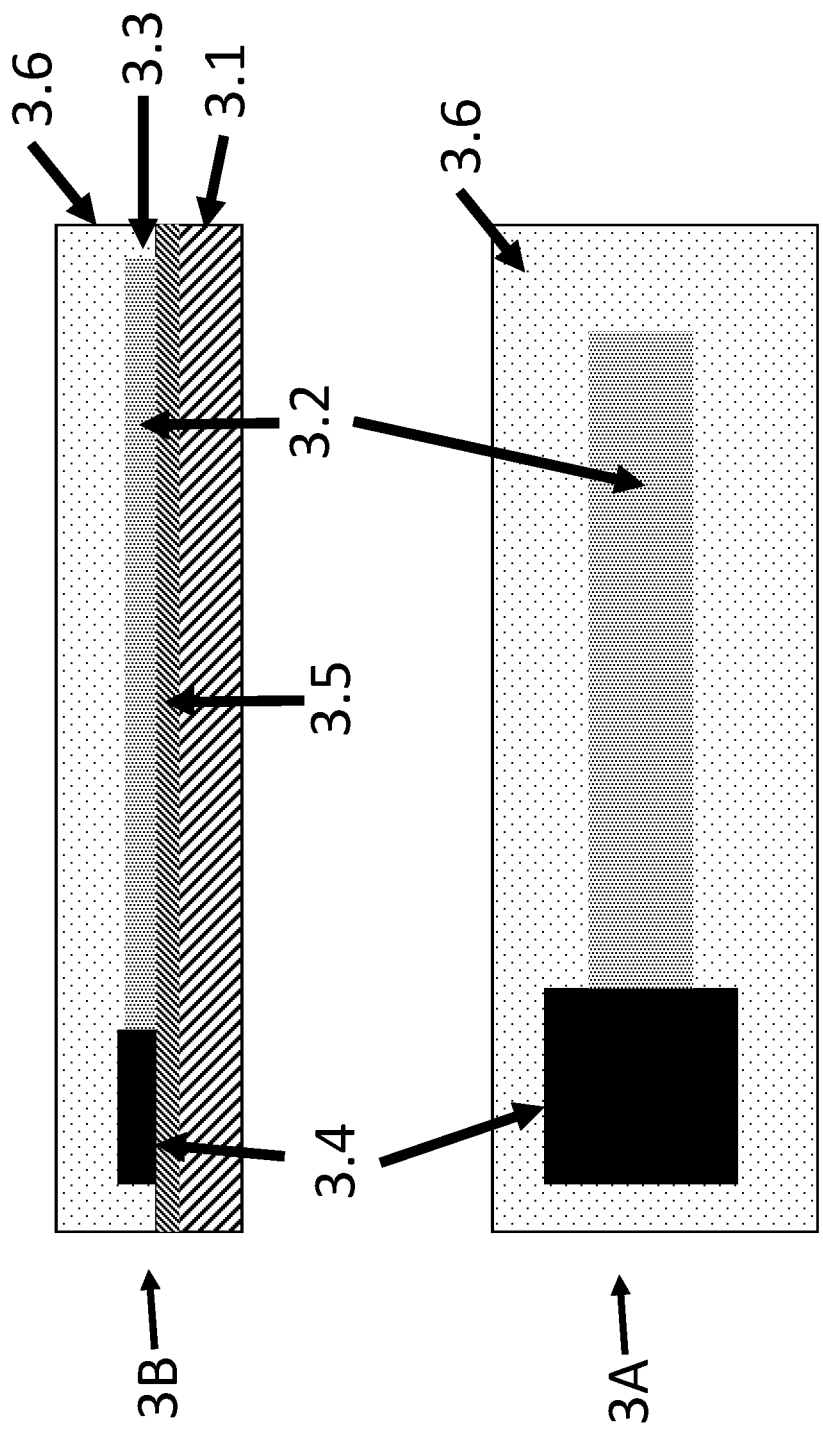
FIG. 3 is a cross sectional schematic presentation of a moving boundary indicating device made by UV curing different layers where

FIG. 3 shows a cross sectional, FIG. 3B and top FIG. 3A views of a thin moving boundary TTI device that can also be created by UV curing. The device is composed of a substrate 3.1 coated with a tunnel material 3.2 to create a tunnel 3.3 for diffusion of an indicator 3.4 in a predetermined direction. The tunnel material can be a polymeric layer permeable to the indicator or preferably a porous material, such as microcrystalline cellulose in a polymeric binder which can also be cured by UV curing. A piece of paper can be used as tunnel material. The substrate may have an adhesive layer 3.5 for adhering the tunnel material to the substrate which also can be created by UV curing. The device will require a high barrier coat 3.6 which can be prepared by UV curing. The indicator 3.4 can be a sublimeable, diffuseable or jelly solid or a very viscous liquid. If the indicator is colored, there is no need for an activator in tunnel material. If the indicator is colorless, an activator will be required in the tunnel material. When the colorless indicator diffuses through the tunnel, it will react with the activator to produce a colored material to produce a boundary. The movement of the boundary created by the indicator will depend on time and temperature of annealing of the device. This moving boundary TTI device eliminates the need for lamination of layers of conventional TTI moving boundary devices. The device will be thin, less expensive and can be manufactured using conventional UV curing printing presses.

Figure 4:
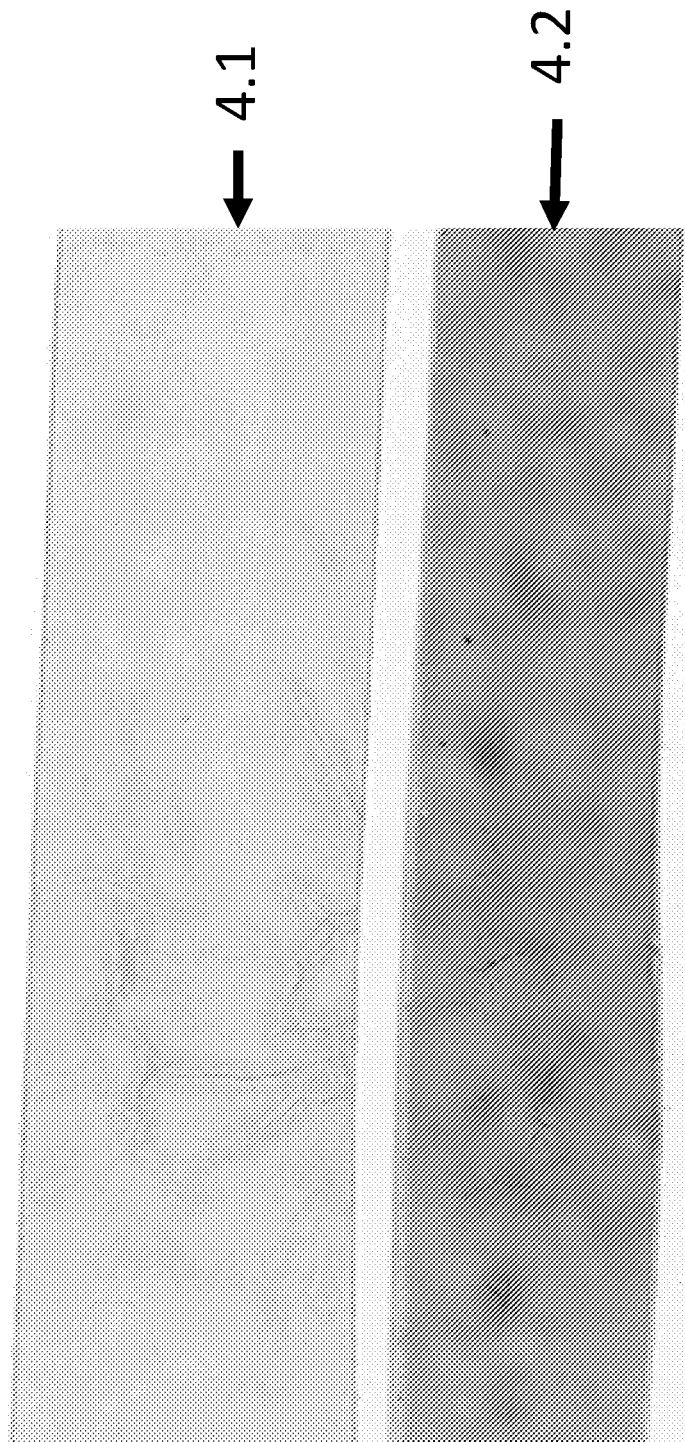
FIG. 4 shows color development of samples of a UV cured multilayer TTI device annealed at room temperature and at 50° C. for 12 hours.

FIG. 4 shows result of a multilayer TTI device created by UV curing indicator and activator layers as per Example 1. A UV curable ink containing iron acetylacetonate as an indicator was coated on a substrate and cured with UV light. A UV curable barrier coat was applied on the cured indicator layer and cured. A UV curable ink containing propyl gallate as an activator was coated on the barrier layer and cured with UV light. The assembly was laminated with a clear polyester film, cut into pieces and annealed at 25° C. and 50° C. for 12 hours. The sample at 25° C. developed a beige color (FIG. 4.1) while that annealed at 50° C. developed purplish gray color (FIG. 4.2).

Figure 5:
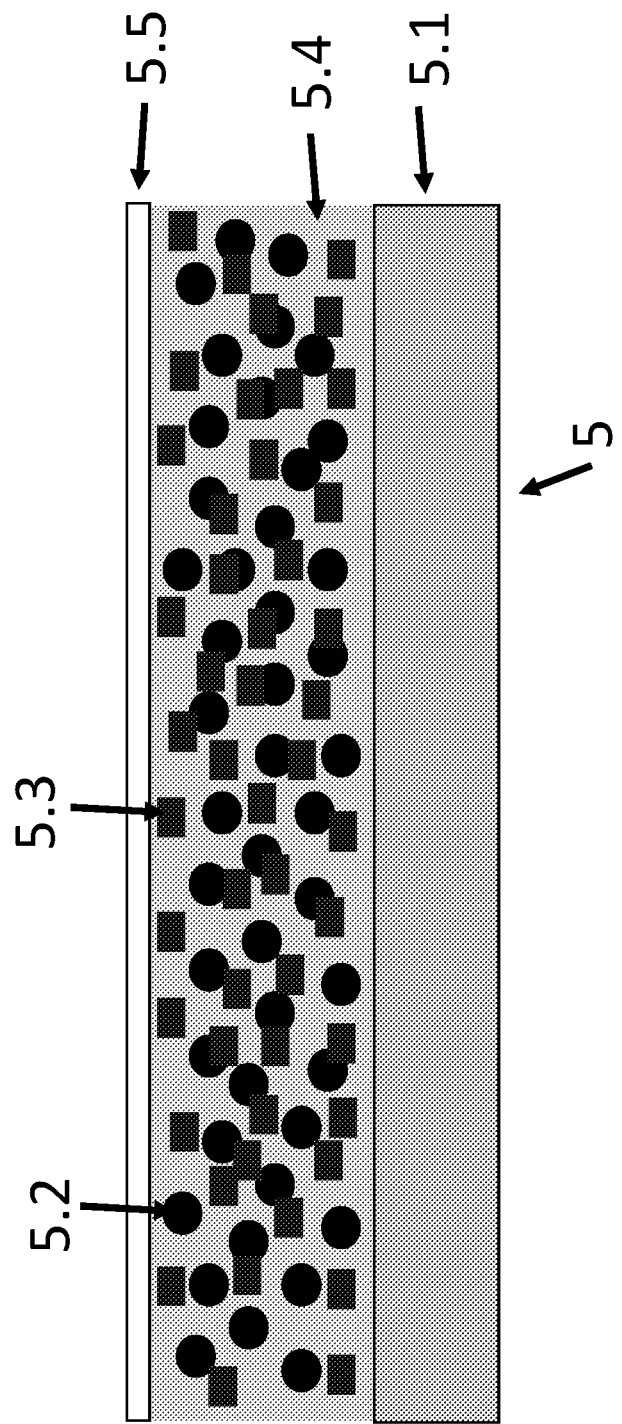
FIG. 5 shows a schematic presentation of a single layer indicating device composed of a binder, and particles of an indicator and an activator on a substrate and a transparent barrier layer.

FIG. 5 show a cross sectional view of a single layer UV cured TTI device 5. The device can be created by mixing fine particles of an activator 5.2 (solid circles) and that of an indicator 5.3 (solid squares) in a UV curable binder 5.4, coating on the mixture on a substrate 5.1, curing with a UV lamp and protecting from ambient conditions by applying a UV curable protective layer 5.5 and curing with a UV lamp. As the UV curing is done in seconds, the possibility of pre-mature reaction between the indicator and activator particles is extremely low during coating and curing. With time and temperature, the indicator and/or activator will diffuse in the binder and react to produce a colored product.

Figure 6:
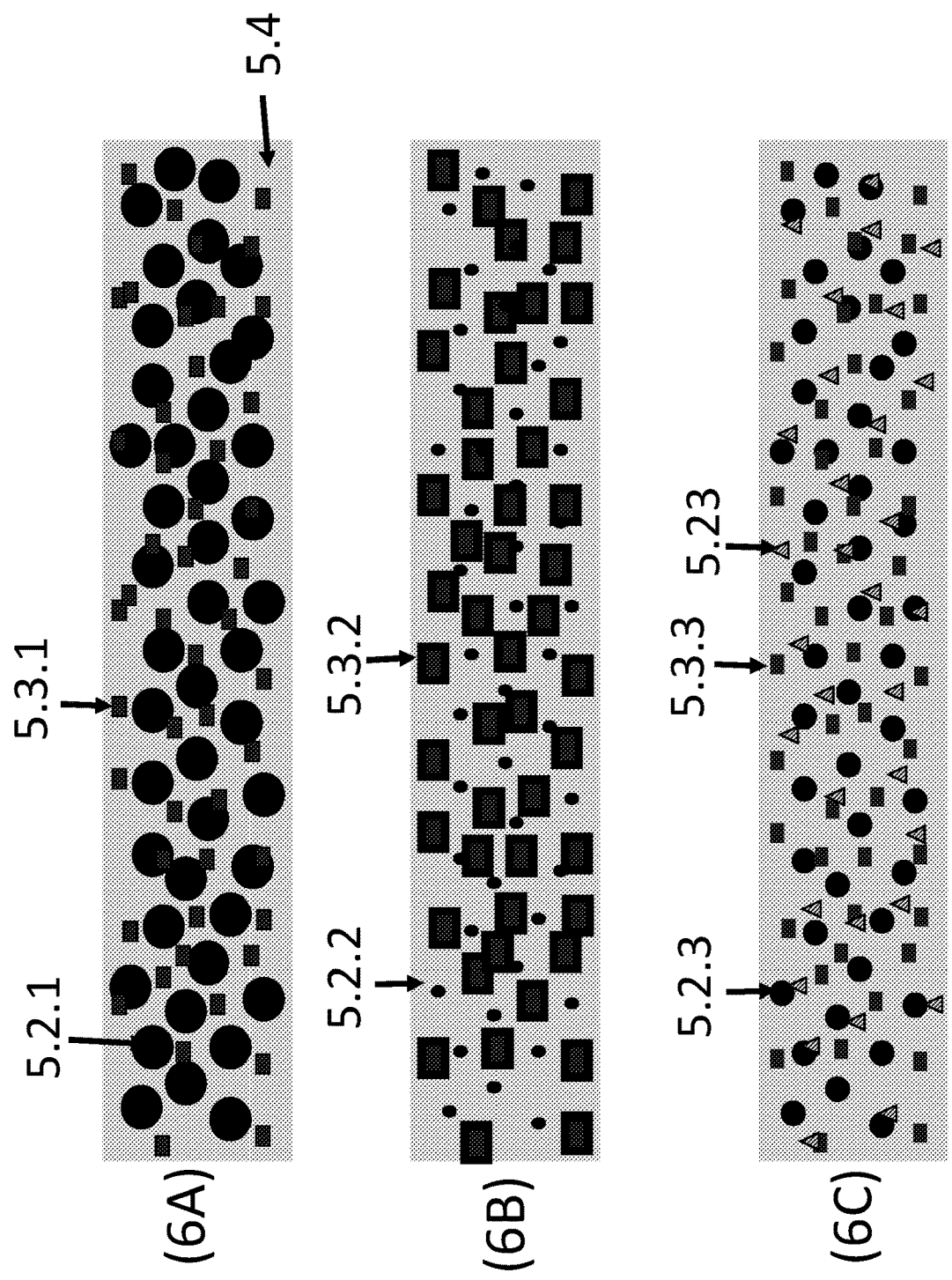
FIG. 6 shows different ways an activator and an indicator can diffuse through the binder and react with each other where 6A shows the indicator moves through the binder, 6B shows only the activator moves through the binder and 6C shows both activator and indicator move through the binder.

FIG. 6 shows schematic presentations of some plausible reactions when indicator and/or activator diffuse through the binder of a single layer TTI UV device: (A) indicator only migrates through the binder and as a result its particles become smaller 5.3.1 and indicator reacts on the surface of activator particles wherein the activator particles get coated with the product formed 5.2.1, (B) activator only migrates through the binder and as a result its particles become smaller 5.2.2 and reacts with indicator particles on the surface of indicator particles wherein the indicator particles get coated with the product formed 5.3.2 and (C) both activator and indicator migrate thereby they becomes smaller 5.2.3 and 5.3.3 respectively and react to form new particles of the product 5.23 in the binder. It is also possible that reaction can lead to all of the above, e.g., a mixture having the activator particles coated with the product, indicator particles coated with the product and particles of the product in the binder. In either case the reaction leads to a color development or color change.

Figure 7:
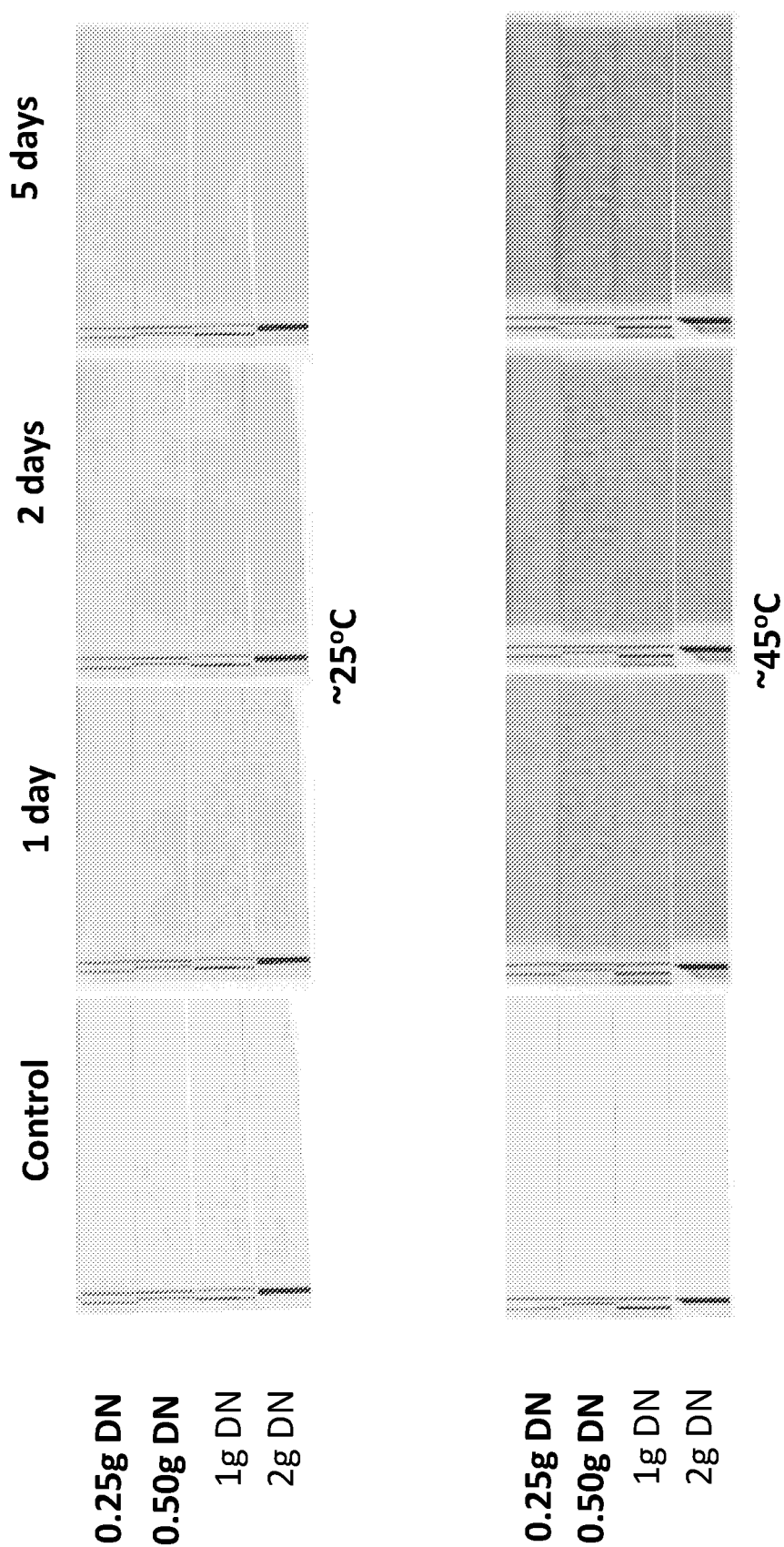
FIG. 7 shows results of a single layer device made from 2,3-dihydroxy naphthalene as an activator and iron stearate as an indicator.

Though UV curing of the single layer is the most preferred method of making the single TTI, as shown in FIG. 7, it can be made by other methods, such as coating from water or solvent based ink. FIG. 7 shows samples of a single layer TTI devices of Example 2 made from milled particles of 2,3-dihydroxy naphthalene (a chelate as an activator) and iron stearate (a metal salt as an indicator) in a water based PSA as a binder. Finely milled powder of iron stearate was dispersed in a water based PSA latex. Finely milled powder of 2,3-dihroxy naphthalene was dispersed in the same water based PSA latex. Both PSA latexes were mixed. When mixed activator and indicator do not react for some time as they are solid so the mixture can be coated and dried by blowing room temperature air. Once coated and dried, the activator 2,3-dihydroxy naphthalene diffuses/migrates and reacts with adjacent particles of indicator (iron stearate) and gradually develops color and the color darkens with time and temperature as shown in FIG. 7. This example shows that even a water based binder can be used to make the single layer TTI devices. Similar devices were made using UV curable PSAs and lacquers. The performance of these devices is similar to other single layer TTI where the reactant is only one component, such as polymerization of diacetylene or isomerization of photo or thermochromic compounds but in this case there are two separate reactants to produce a third molecule (product).

It is known that the color development with time and temperature of the single layer, multilayer or two tape time-temperature indicating devices reported in the literature typically depends on the concentrations of the reactants, such as an activator and an indicator and also depend on thicknesses of their layers. If the concentration of a reactant or the thickness of its layer is higher, the device produces darker color and vice versa. Hence, precision and consistent concentration of the reactants, such as activator and the indicator, and the thicknesses of their layers are essential for every batch for reproducible results. We unexpectedly found that (i) if at least one of reactant is substantially opaque solid and if the reaction substantially occurs on its surface or (ii) if a substantially opaque product is formed on surface of a reactant, the color development with time and temperature is substantially independent after certain concentration of the reactant or after certain thickness of its layer. The independence of color development with time and temperature after certain concentration of a reactant and the thickness of its layer is mainly because if a reactant is substantially opaque or the products formed is substantially opaque, the color intensity becomes independent of its concentration or the thickness after certain level. The results of Example 2 as shown in FIG. 7 support the conclusion. The concept is explained in FIGS. 6A and 6B.

This substantial independence of color development with time and temperature on thickness of the indicating layer is highly desirable, unique and novel for an indicating device, such as TTI and is one of the most preferred embodiment of this invention.

Another embodiment of the invention relates to an indicating device, for example a time-temperature indicating device composed of at least one reactant which is substantially opaque and the reaction or the color development, e.g., with time and temperature occurs on the surface of the reactant.

Yet another embodiment of the invention relates to an indicating device, for example a time-temperature indicating device composed of a reactant which is substantially opaque solid activator and/or substantially opaque solid indicator and the color development is substantially independent of the thickness of the indicator layer and concentration of the reactant.

Depending upon the need, application and situation, a matrix of a layer, e.g., that of an activator layer can be a UV curable adhesive or a non-adhesive, soft or hard. For certain other applications, such as a steam sterilization indicating device, the activator matrix could be a non-adhesive matrix/resin containing an activator or a precursor for an activator and can be applied directly on the indicator layer. These non-adhesive matrices can hold an activator or precursor for an activator which become effective under proper conditions, e.g., when certain temperature and humidity levels are reached.

Depending upon the need, application and situation, an activator can be replaced with its precursor. For example, for sterilization with ethylene oxide and hydrogen peroxide, one can use precursors, such as sodium thiocyanate and tetrabutylammonium bromide respectively. Sodium thiocyanate when reacts with ethylene oxide produces sodium hydroxide which can react/dissolve a metal layer or react with a pH color changing dye. Similarly, tetrabutylammonium bromide can react with oxidizing agents, such as hydrogen peroxide or its plasma to produce an acid, such as hydrobromous acid which can also react with an indicator which a metal layer or a pH color changing dye.

All devices shown herein may have an opaque, e.g., white layer in the back of the devices, so all messages and images can be seen.

Moving boundary indicating devices available commercially are large, very complex and expensive. It is possible to make any size, from a few millimeters to several centimeters long moving boundary indicating systems by the UV curing method as shown schematically in FIG. 3A (top view) and FIG. 3B (cross sectional view). A substrate 3.1 can be coated with a UV curing pressure sensitive adhesive or pressure sensitive adhesive having micronized cellulose/cotton or similar porous microns sized materials, and optionally an indicator and UV cured to create a wicking or permeable layer 3.2. A thicker and larger layer of activator reservoir 3.4 is applied at one end of wicking/permeable layer and UV cured. If the activator is a dye, it may not need an indicator. The binder for the activator reservoir will be a soft polymer, such as pressure sensitive adhesive so it can easily release the activator. The ratio of activator to binder will preferably be more 1:1 so sufficient quantity of the activator will be easily available. A UV curable resin which forms a very high barrier layer 3.6 is applied and cured. This types of moving boundary devices will be small, accurate, reliable and easy and faster to manufacture. The activator 3.4 can be solid which melt at a predetermined temperature to create a threshold indicating device. The activator 3.4 can also be viscous liquid.

The above described moving boundary devices of FIG. 3 can be made by sandwiching wicking layer and activator reservoir between two substrates, each or at least one of them having a layer of hot melt or pressure sensitive adhesive but the UV curing method described in FIG. 3 will be faster and less expensive to make the indicating devices and will be better performing.

As UV curing is a fast reaction, it is possible to mix fine particles (e.g., milled) of an activator and indicator in a UV curing ink and coat on a substrate to make a TTI or other indicating device. This is possible by selecting UV curable formulation in which activators and indicators are not readily soluble. The device may have a protective coat, preferably cured by UV.

To make a single layer indicating device, fine dispersion of reactants, activator and indicator made by a method of making nano to microns sized particles, including milling, disperse the reactants individually in the same or different UV curable resin, mix, coat and UV cure. The single reactant layer indicating system may have a protective barrier coat or can be laminated with a protective barrier substrate.

When activator and/or indicator are solid particles, the reaction between the reactants could be on the surface of the other reactant, for example an activator diffuses and reacts at the surface of the indicator particles or vice versa. This type of surface reaction may limit the color development. If both reactants are volatile and migrate in the binder, then the color development can be fast and intense.

Other than the curing of the binder, all other ingredients, especially indicator, activators and all additives of the indicting systems must not be affected or should have negligible effect of UV light used for curing the binder.

The basic principle and mechanism of single layer TTI is to select a binder in which the activator and indicator are not soluble and keep two reactants, preferably in form of fine solid particles, away from each other in a medium preferably a polymeric in a non-solvent or a UV curable ink to prevent them from reacting prematurely. Once coated and dried or UV cured, the reactants will react with time and temperature by diffusion of at least one reactant through the polymeric binder to reach the other reactant and produce a noticeable or measureable change. Two solid, liquid or emulsified reactants can be dispersed separately in the same or different binders in a vehicle which does not dissolve them. If the ink medium is a non-solvent, activator and indicator will not react rapidly when added and mixed. Prior to making the devices, the dispersions are mixed, coated and dried or cured with UV light to make an indicating layer of the device. The mixture of activator and indicator in a vehicle/ink can be kept cold and even frozen till ready to be used. At low temperatures, especially in the frozen state they will not react, especially when the medium or the liquid is not a solvent for one or more reactants.

The reaction between the reactants could occur on the surface of the particles of the other reactant, for example an activator diffuses and reacts at the surface of the indicator particles or vice versa. This type of surface reaction may limit the color development. If both reactants are volatile and migrate in the binder, then the color development can be faster and more intense. The rate of reaction and the activation energy (Ea) of the devices can be controlled by many factors such nature and concentration of activator, indicator, binder and other additives.

The activator and indicator can be any two solids which when react produce a measurable or noticeable change. The activator can be a solid acid, base or salt and indicator can be a solid pH dye. The activator and indicator can be very selective solid as well. Indicator and activator can be very selective reactants, i.e., only those two reactants can react to produce that particular color. Additionally, usually, one activator molecule of an activator reacts with one molecule of indicator to produce color products. It is preferred that there is disproportional reaction between activator and indicator. For example, the reaction between chelate molecules and metal ion is usually disproportional, for example, one molecule of iron may need three molecules of chelate to form a color complex.

The current indicating devices on first glance may appear to be somewhat similar to that of known two-tape and other similar multilayer devices and processes. However, the current devices and the methods of making them are not only significantly different but differ in many ways from the devices and methods of the known art and hence offer most desired properties and many advantages over the prior art devices. Some of the unique and novel features of the current devices are not possible with the known methods. In all known indicating devices, at the most, only one layer is cured with UV. If there are more than two layers, then they are cured separately. In the current invention, a composite indicating device is made by UV curing one layer after the other. Using the methods and designs disclosed herein, one can make, for the first time (i) a single layer TTI device of FIG. 5 which is not possible otherwise to create from a mixture of indicator and activator, (ii) a multilayer TTI device of FIG. 1 without using the two-tape device and (iii) a paper thin moving boundary device of FIG. 3 without using a cut filter paper, adhesive and lamination of different layers. Making the TTI devices (i) from an activator and an indicator by other methods reported in the literature (e.g., the two tape device of U.S. Pat. No. 5,053,339) and (ii) multi-component moving boundary devices (e.g., U.S. Pat. No. 7,232,253) are bulky, large, very slow and/or expensive as many separate steps, parts and/or operations are required. One can make very small and paper thin moving boundary device of FIG. 3 using commercially available UV curing presses with this invention.

COMPONENT/PARTS OF THE DEVICE

UV Ink/Binder:

A type of radiation-curing ink that dries, cures or sets with the application of ultraviolet light can be used for making the indicating devices. UV curing ink vehicles are composed of polymerizable fluid oligomers (short chain polymers), monomers (light-weight molecules and that bind together to form polymers), polymer and initiators that, when exposed to ultraviolet radiation, release free radicals (extremely reactive atoms or molecules that can destabilize other atoms or molecules and start rapid chain reactions) that cause the polymerization of the vehicle/binder, which hardens to a dry ink or soft adhesive film containing the ingredient of the coating. UV curing inks are designed to replace heat-set/dried inks whose solvents emit potentially toxic gaseous emissions.

The UV curing inks can form an adhesive, soft layer or very hard and highly crosslinked layer. The UV cured polymer (often referred to as a binder herein) should allow diffusion of at least one reactant. A binder which can wet the particles or dissolve ingredients, such as activator and indicator is preferred. The words, binder, medium, resin, vehicle, matrix and UV ink or vehicle are used interchangeably herein.

UV curable vehicles, resins and inks for the devices can be mixtures of UV curable acrylate monomers and oligomers, which contain a photo-initiator. For example, the monomeric and oligomeric acrylates can be methyl acrylate, ethyl acrylate, butyl acrylate, ethylhexyl acrylate, hydroxyethyl acrylate, acrylic acid, methyl methacrylate, hexyl methacrylate, beta-phenoxy ethyl acrylate, hexamethylene acrylate, 2-phenoxyethyl acrylate, beta-carboxyethyl acrylate, ethoxyethoxyethyl acrylate, glycerol propoxylate triacrylate, hexane diol diacrylate, pentaerythritol tri/tetra acrylate, propoxylated neopentyl glycol diacrylate, trimethylolpropane ethoxy triacrylate, trimethylolpropane triacrylate, tripropylene glycol diacrylate and tetraethylene glycol diacrylate. Classes of UV curable materials that can be used are acrylated and methacrylated alkyls, esters, epoxies and urethanes monomers and oligomers that available from a number of companies, for example, Sartomer, Exton, PA, USA.

The degree of UV curing can be controlled by selecting proper monomer, oligomer, initiator and UV intensity and exposure time. A UV cured binder should be permeable to either activator or indicator.

Light Source:

The ink can be cured by IR, visible, UV (long and short), X-ray and electron beam depending upon the photo-initiator and UV curing monomer used. The preferred light source is UV. The UV light source can be intense LED (light emitting diode). The typical light source spectrum wavelength ranges from Ultraviolet Light (UVC 200-280 nm, UVB: 280-315 nm, UVA 315-400 nm) to Visible Light (400-760 nm).

Substrate:

Any solid substrate can be used as a substrate for the indicating device. Preferred substrate is a flexible plastic film and natural (e.g., cellulose) and synthetic (e.g., spun bonded polyolefins, e.g., Tyvek™) papers. Fiber reinforced substrate can be used for sealing tape indicating device. Plastic substrate could be self-colored (pigmented) or coated with a color layer. It could be transparent, semi-transparent, translucent or colored with various intensities. The polymer films include polyolefins (linear or branched), polyamides, polystyrenes, nylons, polyesters, polyurethanes, polysulfones, styrene-maleic anhydride, styrene-acrylonitrile, ionomers based on sodium or zinc salts of ethylene methacrylic acid, polymethyl methacrylates, cellulosics, acrylic polymers (acrylates, such as ethylene methacrylic acid, ethylene methyl acrylate, ethylene acrylic acid and ethylene ethyl acrylate), polycarbonates, cellophane, polyacrylonitriles, ethylene-vinyl acetate and their copolymers can be used as substrate for the devices. The preferred substrates are polyethylene, polypropylene, polyester, cellulose acetate, polyvinyl chloride and their copolymers. These substrates can be metallized.

One may use high barrier film, such as EVOH (ethylene vinylalcohol copolymer), polyvinylidene chloride or plastic films coated with aluminum oxide and silicone oxide impermeable substrates are preferred substrates. Impermeable to all components of the device, heat sealable, coatable, and with top protective film or the layer transparent and the bottom substrate, preferably be opaque or a metallized film are preferred substrate.

Indicator Layer:

The indicator layer can be composed of an indicator composition, UV curable composition/ink and optionally an additive, such as a controller. Indicator composition can be in form of fine particles or dissolved in the UV curable composition. The indicator composition should not substantially reduce the UV curability of the UV ink or cause premature curing.

Activator Layer:

The activator layer can be composed of an activator composition, UV curable composition/ink and optionally an additive, such as a controller. Activator composition can be in form of fine particles or dissolved in the UV curable composition. The activator composition should not substantially reduce the UV curability of the UV ink or cause premature curing. Either indicator or activator should be able to diffuse through the binders of the layers. It is preferred that only one, either indicator or activator diffuse through the binders. Upon contact and reaction between them, they should produce a noticeable change, such as a color.

More Than Two Reactants:

In order to obtain more than one color or message, one may use two different activators which produce two different colors or one reacting faster than the other and vice versa. For example, one can use two dyes and one acid or vice versa or one chelate and two metal ions and vice versa, each pair reacting at different rates and/or providing different colors.

Particle Size:

The size of the solid reactant particles could be from nanometers to several tens of microns, for example, from 10 nm or 100 microns. If required, the particle size can be larger. The fine particles of the reactants can be obtained by many processes, such as conventional methods of milling solids, heating in a medium to dissolve at high temperature and cooling, especially by rapid cooling, making nano and micron sized particles. Commercially available micronization methods, such as milling, bashing and grinding and modern methods, such as spiral jet milling, fluidized bed jet milling, high speed homogenization, jet spraying, and supercritical fluid methods can be used to produce required sized particles of indicator and activators.

Methods:

The devices can be made by many different ways. One such method is: (i) make fine dispersion of reactants, activator and indicator by a method of making nano to microns sized particles, including milling, (ii) disperse the reactants individually in the same or different binders, (iii) mix the dispersions, coat on a substrate, cure or dry, and (iv) laminate with a substrate or apply a barrier coat.

Security Inks:

The single layer indicating formulations can be used as security inks and their coatings as security devices. Genuine and authenticity of an article can be confirmed from the color development of the devices/coating/labels with time and/or time and temperature. Different color compositions and rate of the color development can be used for different items and customers.

Threshold Indicator:

It is possible to develop a threshold time-temperature or temperature indicator by selecting at least one reactant, preferably both having negligible reactivity or vapor pressure or diffusion below the threshold temperature and melt when a pre-determined temperature is reached. Further preferred is a binder either melts or has glass transition temperature (Tg) near the melting point of the reactant. The reactants should be insoluble in the UV curable binder.

Permeable Barrier Layer:

Permeable layer as defined herein is a layer which is permeable to activator, indicator and/or other ingredient of the device. Any material which can be UV cured and lets activator and/or indicator diffuse or migrate through under controlled conditions can be used to make a permeable layer. Preferred permeable layer is a polymer. The nature of the permeable layer will depend on the activator and indicator. It is mainly used to control/vary the time required for the color change and the activation energy (Ea). It is preferred to have a layer permeable to activator and/or indicator located between the activator and indicator layers. Thicker and harder the permeable layer, it will increase the time required for the color change and vice versa.

Storage and Shipment:

The indicating devices made by the UV curing methods disclosed herein will be active from the moment they are made. Many of these devices which are sensitive to ambient conditions should be protected from ambient conditions unless they are designed to measure ambient conditions, such as time, time-temperature, humidity and UV light. The time-temperature indicating devices should be kept cold to prevent diffusion or pre-mature reaction. Devices designed to measure moisture and UV light should be protected till used.

Extra Layers:

The indicating devices of current invention can have many additional layers as shown in FIG. 2. These layers can have any color, shape, thickness, size and nature as desired. The position of these and other optional layers relative to one another can often be changed and can often be interchanged. Most of these layers can be whole, partial or discontinuous. Some of these layers can be in form of a pattern, message or image.

Another embodiment of the indicating system of the invention comprises a system wherein an additional one or more layers are added to the system, wherein the layers are selected from a binder layer, a permeable layer, a wedge shaped permeable layer, a barrier layer, reactive layer, destroyable or degradable barrier layer, an expiration indicating layer, a tamper indicating layer, an activation indicating layer, a message or image creating layer or a separating layer, a removable layer, a disappearing layer, an activatable layer, masking layer, a microencapsulated layer, thermally printable layer and like.

Messages:

In another embodiment, the indicating system of the invention can also have at least one message which appears as a word or symbol on at least on one side of the indicator layer. The message can be in color. A message can be on or inside surfaces of any layer of the indicating system. In certain instances, the system can contain at least two messages which do not start to become observable at the same time. An example is an indicator of the status or quality of an item when the indicating system is applied on or before the treatment of the item and a second message alone or in combination with the first indicating status or quality of the item after its treatment, such as, where the first message indicates un-doneness, freshness, usability, acceptability of the item and the second message alone or in combination with the first indicates doneness, spoilage, not usability and unacceptability of the item after a treatment or where the first message indicates non-sterile, non-usability, not-acceptability of the item and the second message alone or in combination with the first indicates doneness, sterile, usability and acceptability of the item after a treatment.

The surface of substrates can be printed either continuously or selected areas. E.g., lines, dots (barcodes), words, image or numbers. When the activator diffuses and reaches the indicator it will introduce a color change. If a colorless indicator is printed in form of a message, e.g., barcode or number, they will become visible. It is contemplated that any layer of the indicating system can contain a message or writing on either side of each layer. Required message can be printed on or under the substrates of the system by common printing methods.

The first message can be printed as "Fresh", "Sell" and "Use", and the final message appearing as "Not Fresh", "Don't Sell" followed by "Don't Use". Nature of the message depends upon the application of the device.

Moving Boundary:

One also can create a moving boundary by using a wedge shaped UV cured permeable layer between the activator and the indicator layers of FIG. 1 in a manner disclosed in U.S. Pat. No. 8,343,437.

Moving boundary versions of a time, time-temperature and sterilization indicating device can additionally have all the basic features described herein including activators, precursor for activators, indicators, binders, substrates, adhesives, different layers and other properties and processes.

The moving boundary devices could have a scale and/or numbers to indicate degree of the reaction. It also could have most of the messages and images of those having no permeable layer or that of uniform thickness.

The moving boundary devices can generate a series of messages for example for reminding when to take a drug/medicine. Take $1^{st}$, $2^{nd}$, $3^{rd}$ . . . dose etc . This will remind patients and others when to take a prescribed drug or other instruction do this, do that, don't do this etc.

The moving boundary devices can be created for other indicating device disclosed herein, for example, steam, ethylene oxide, plasma of oxidants, such as hydrogen peroxide, formaldehyde, dry heat, temperature and radiation.

Applying on Perishables:

The indicating device can be applied on to an object by removing the release liner and the release layer. The release layer can be composed of a nonstick material which does not bond or bonds very weakly with a PSA. The release materials include silicone, fluoropolymers, such as polytetrafluoroethylene, highly crosslinked resins and oils. The preferred release material is a silicone and a fluoro-polymer.

Size & Shapes:

The size of the indicating devices can be as small as a few square millimeters to very large size, e.g., a square meter. The thickness of the device typically can be from a thousandth of a centimeter to a millimeter, or thicker, if desired. The device can also be in form of large labels, stickers and alike.

Multi-Sensor Devices:

It is possible to create multi-indicator devices for monitoring more than one process. For example, the indicator changing color with temperature and also with time and temperature. Another way of creating multi-sensor devices is to add one indicating devices on, below or on the side of the current devices. For example, one can apply a freeze or temperature indicating device on or below a current indicating devices.

Tamper Indicator:

All these devices of the present invention could also be made tamper indicating according to materials and methods disclosed in US patent application number 20120244623. For example, the indicating device could have one or more tamper indicator layers or made from tamper indicating materials. If the device is tampered or the integrity of the device is destroyed, a message, such as "VOID" or "TAMPERED" will appear.

As many of the indicating devices disclosed herein have two pressure sensitive adhesive layers, one containing activator and the other to apply to a substrate, one can also use tamper or void indicator for each.

Sealing Tape:

The device can also be in form of a very long tape which can be wrapped on any object including boxes containing food or pharmaceutical packages or cut into small pieces and applied on individual object. The long tape indicating device can also be applied on closer of a perishable container so it can be easily noticed and shelf life can be monitored.

Sealing tape indicating device is a longer version of a time, time-temperature and sterilization indicating devices. It can have all the basic features described herein including activators, indicators, binders, substrates, adhesives, different layers and other properties and processes.

All indicating devices including sealing tape indicating devices can have a tamper indicating feature, e.g., that created by printing with a silicone coating under the indicator/metal layer.

The indicating sealing tape device is preferably applied at the point where boxes are typically sealed.

Color Reference Charts:

The devices proposed here can have one or more color reference bars or charts to determine extent of a reaction or process. This is particularly useful when use of a color reference chart is mandatory, has become a tradition/practice or is preferred. The color reference charts for the current invention could be similar to those described in the prior art devices or those used in the market. The color reference chart could be any shape, e.g., circular, rectangular, square and alike, and could have one or more color reference bars for estimation of different stages of the shelf life or advancement of the processes. Color reference bars could be on any layer or by having an additional layer as long as they are visible or become visible when required.

APPLICATIONS

A wide variety of indicating devices can be made by the UV curing method disclosed herein. Using proper pairs of activators and indicators, it is possible to monitor a variety of materials and processes including:

Time (e.g., self-expiring visitor's badges, employee IDs).
Temperature (e.g., microwave doneness).
Time-temperature (e.g., monitoring shelf life of perishables).
Freeze (e.g., for fresh blood, produce, some vaccines).
Thaw/defrost (e.g., for frozen foods).
Humidity (e.g., pharmaceuticals and foods).
Sterilization (e.g., monitoring sterilization of medical supplies and perishables): Steam, ethylene oxide, plasma/hydrogen peroxide, radiation, and
Toxic chemicals and biochemicals (e.g., chemical and biological agents).

Thaw Indicator:

The thaw (freeze to thaw) indicating device for monitoring frozen state and shelf life of the frozen items/perishables, such as frozen foods will be essentially identical to that of time-temperature indicating device and made essentially by the same methods as described herein. The major difference will be the state of the activator or activator layer. The activator for the thaw indicating device will become essentially solid and/or non-migratable/nondiffusable in case of the thaw indicating devices when the item it is applied on is frozen.

By selecting proper activator which freeze or stop the diffusion, one can develop a freeze-thaw indicator. One can develop freeze indicator by mixing a freeze indicating formulation reported in literature in a UV curable ink and cure the ink.

Steam Sterilization Indicator:

Steam sterilization indicators can be created by mixing proper indicators and activator which react above 100° C. These pairs of indicators and activators can react either when they melt or dissolved by steam.

Monitoring Ethylene Oxide (ETO) or Sterilization with ETO:

Any chemical which produces reactive species, such as acids, bases and salts upon reaction with ETO can be used as a precursor for the activator for ETO. The acids, bases and salts thus produced can react with an indicator/metal and produce the change or dissolution of the metal or surface of metal particles. A metal cation, such as that of (1) monovalent metals, such as sodium and potassium, (2) the other halides, such as bromides or iodides, of di or higher valent metals, (3) organic halides, such as tetrabutylammonium bromides and (4) other salts, both organic and inorganic, such as sodium thiocyanate can be used as precursor for activator for the ETO indicating device. These compounds react with ETO and probably produce a base, such as sodium hydroxide which can react with metals, such as aluminum and copper and their alloys or a pH dye which changes color with sodium hydroxide.

Monitoring Oxidants, Their Plasma and Sterilization:

Any chemical which produces reactive species, such as acids, bases and salts with oxidants, such as hydrogen peroxide and peracetic acid or their plasmas can be used as a precursor for the activator for plasmas and strong oxidants. The acids, bases and salts thus produced can react with an indicator, such as nano thick metal or pH dye and produce color change or change in opacity. A variety of classes of organic and inorganic compounds can be used as activators for monitoring hydrogen peroxide and its plasma. They include alcohols, amides, amines, bisulfites, bisulfates, carbonates, carbamates, chelates, metal complexes, cyanates, esters, halides, halocarbons, ketones, nitrites, nitrates, nitriles, nitro, nitroso, oximes, phenols, phosphates, sulfates, sulfides, sulfites, thiocyanates, ureas, urethanes, salts, oxidants and reducing agents. Organic and inorganic salts, especially halides can be very effective activators or precursors for activators. These halides include, acetyl choline chloride, ammonium bromide, choline chloride, choline iodide, dodecyltrimethylammonium bromide, glycidil trimethyl ammonium chloride, potassium bromide, potassium iodide, sodium iodide, tetrabutyl ammonium iodide, tetraethyl ammonium bromide, tetrahexyl ammonium bromide, tetramethyl ammonium chloride and tetrabutyl phosphonium bromide.

It is also possible to use complexes of acids and bases, e.g., aminoacid:phosphoric acid, urea:phopshoric acid and ferric phosphate complexes.

Humidity Indicator:

By selecting a proper indicator activator pair one can make highly sensitive moisture/humidity and can be used as a humidity indicating device. Similarly, one can make a oxygen indicating device. Metals useful for humidity and oxygen indicating device are sodium, lithium, potassium, cesium and alike and their alloys. In the cases of humidity, steam and oxygen indicating devices, oxygen and water are activators.

Several metals and metal oxide, such as sodium and calcium and their oxides can be used as precursor for activator for moisture indicating devices. Non-metal hygroscopic and desiccant materials, such as anhydrides, phosphorus and its oxides can also be used. $P_2O_5$, phosphorous pentoxide (and its homologs) is a desired precursor because it is extremely hygroscopic and produces an acid (phosphoric acid) reacts with water and etches metals or changes the color of pH dye. A coating of dissolved or finely dispersed phosphorous pentoxide on the indicator layer can be used as a humidity indicating device.

Phosphorous oxychloride ($POCl_3$) reacts with water to produce HCl. Phosphorous pentachloride and trichloride ($PCl_5$ and $PCl_3$), which produce an acid can be used as precursors for activators for monitoring moisture/humidity. These materials can be microencapsulated. Similarly, halides which decompose at higher temperatures to produce acids can be used for other indicators including sterilization, especially for steam.

White and yellow phosphorus reacts with oxygen but not with water and produces phosphorus oxide which when reacts with water/humidity produces phosphoric acid which is an activator. Thus white or yellow phosphorus, e.g., thin coating or encapsulated, can be used for monitoring time after opening a container. Oxygen reactive compounds which produce an activator can be used for these applications.

Time-Indicator:

The effect of temperature can be minimized and the device can be made a time indicator by counter balancing reactions, e.g., crosslinking of the media/binder with diffusion. The time of time-indicating device can be varied by crosslinking softer or rigid polymers.

Fluorescence and Security:

Indicating devices proposed here can also be used for identifying forgery, i.e., as security devices. In addition to color changing, a large number of reactions are associated with a change in fluorescence rather than a color change in the visible region. Such compounds can be used as indicator and also for security. All colors herein could also be fluorescence colors as well.

INGREDIENTS OF THE DEVICE

Reactants:

Reactants can be one or more solid or liquid activator or indicator and can be dissolved or dispersed in UV ink. The indicator and activator will be in pair, e.g., a pair of a pH dye and an acid or base and a pair of a chelate and a metal salt or metal complex which when react produce a measurable or noticeable change.

At least one of the reactants should be able to diffuse through the binder and permeable barrier layer to reach the other.

Nature of Reactants:

The reactants can be insoluble or soluble in UV ink. If a reactant is an immiscible liquid, it can be emulsified. In order to monitor material, such as humidity, water, oxygen or a chemical, at least one of them should be affected by such materials, e.g., dissolution or reaction with a reactant. In case of steam sterilization, at least one reactant, preferably should get dissolved or react only above 100° C. are preferred.

Activators:

There are many pairs of indicators and activators that can be used for the devices proposed here. Any chemical which can react with another material and can introduce a noticeable or measurable change can be used as an activator. Activators can have a co-activator. Co-activator can be a moderator/modulator and can increase or decrease the effect of an activator as desired. Sometimes two activators can have synergistic effect. A solvent, wetter, surfactant or plasticizer can also be used as co-activator. The terms, co-activator, moderator and modulators are used interchangeably herein.

The activator can be a gas, liquid, semi-solid or solid. Preferred activator is a liquid or solid which can diffuse through a polymeric medium. Activators can be monomeric, oligomeric, polymeric, mono-functional or multi-functional compounds.

When a pH dye is used as an indicator, one can use an acid or a base as an activator for the devices. A variety of amines are available which can be used as a base for the pH dye. Amines, such as primary, secondary, tertiary and quaternary amines of mono or multi-substituted or un-substituted aliphatic, acyclic and aromatic compounds can be used as activators for some of the devices. Examples of amines and their salts include: adamantanamine, adenine, amino cyclohexanol, amino diethylaminopentane, amino dodecanoic acid, amino ethyl dihydrogen phosphate, amino ethyl hydrogen sulphate, amino pentenoic acid, amino propyl imidazole, amino propyl pipecoline, amino sorbitol, amino undecanoic acid, amino-butanol, aminodeoxy-d-sorbitol, aminoethyl dihydrogen phosphate, aminopropyl imidizole, ammonium acetate, ammonium bromide, ammonium carbaminate, ammonium carbonate, ammonium chloride, ammonium dihydrogen phosphate, ammonium ferrocyanide hydrate, ammonium formate, ammonium hydrogen carbonate, ammonium hydroxide, ammonium iron (11) sulfate, ammonium iron (111) citrate, ammonium iron (111) oxalate trihydrate, ammonium nitrate, ammonium per sulfate, ammonium phosphate dibasic, ammonium sulfamate, ammonium sulfate, benzyl-n-methylethanolamine, benzyltrimethylammonium chloride, bis(dimethylamino) benzophenone, chloroethylamine monohydrochloride, chlorohydroxypropyl trimethyl hydrochloride, chloronitroaniline, choline, choline chloride, choline hydroxide, choline iodide, cyclohexyamine, decylamine, diallyl dimethyl ammonium chloride, diaminodiphenylamine, diaminododecane, diaminoheptane, diaminohydroxypropane, diaminononane, diaminooxapentane, diaminopropane, dibutylamino propylamine, dibutyl amino benzaldehyde, diethanolamine, diethyl amine, diethyl aminopropylamine, diisopropyl ethylamine, dimethyl amine, dimethyl amino ethylmethylamino ethanol, dimethyl amino benzaldehyde, dimethyl aminopropoxy benzaldehyde, dimethyl aminopropylamine, dimethyl ammopyridine, dimethyl glycine, dimethyl glyoxine, dimethyl imidizole, dimethyl imidizolidinone, dimethyl propane-diamine, diphenylamine, diphenylamine, diphenylbenzidine, dodecylamine, dodecyltrimethylammoniumbromide, ethanolamine, ethanolamine hydrochloride, ethyl amine, ethyl aminobenzoate hydrochloride, glycidil trimethyl ammonium chloride, histidine, hydroxylamine hydrochloride, hydroxylamine sulphate, imidazole, imidazolidone, iminodiacetic acid, methyl amine, methyl imidizole, nitro aniline, nitro diphenylamine, octa decylamine, phenylenediamine, polyethylenimine, tetrabutyl ammonium hydroxide, tetrabutyl ammonium iodide, tetraethylammonium bromide, tetraethylammonium hydroxide, tetrafluorophenylimidizole, tetrahexylammonium bromide, tetramethyl ammonium acetate, tetramethyl ammonium chloride, tetramethyl ammonium hydroxide, tetramethyl ethylenediamine, tetramethyl ethylethylenediamine, tetramethyl hexanediamine, tetramethyl propanediamine, tetramethyl guanidine, triallylamine, triethanolamine, triethylamine, triethylenetetramine, triethylenetetramine hydrochloride, triethylethylenediamine, tridecylamine, trimethyl ammonium chloride, trimethyl-propanediamine, trimethylamine hydrochloride, trioctylamine, trioxa-tridecanediamine, triphenylamine, tris(hydroxymethyl) aminomethane and tris (methoxyethoxy) ethylamine.

Organometallic Compounds:

Organometallic compounds containing bonds between carbon and a metal can be used as activators. Examples of such organometallic compounds include all Gilman reagents, which contain lithium and copper. Tetracarbonyl nickel and ferrocene are examples of organometallic compounds containing transition metals. Other examples include organomagnesium compounds like iodo(methyl)magnesium MeMgI, diethylmagnesium ($Et_2Mg$), and all Grignard reagents; organolithium compounds, such as n-butyllithium (n-BuLi), organozinc compounds, such as diethylzinc ($Et_2Zn$) and chloro(ethoxycarbonylmethyl)zinc ($ClZ_nCH_2C$(=O)OEt); and organocopper compounds, such as lithium dimethylcuprate ($Li^+[CuMe_2]^-$). They also include metal-containing compounds lacking direct metal-carbon bonds but which contain organic ligands. Metal beta-diketonates, alkoxides, and dialkylamides are representative members of this class. Many complexes feature coordination bonds between a metal and organic ligands. The organic ligands often bind the metal through a heteroatom, such as oxygen or nitrogen, in which case such compounds are considered coordination compounds. Furthermore, many lipophilic compounds, such as metal acetylacetonates and metal alkoxides, called "metalorganics" can also be used.

Solid which do not generate vapor may not be very effective activator. However, a solid dissolved in another solvent/liquid or sublimeable solid which can be carried along with the vapor of activator can be effective.

Oxidizing Agents:

Oxidizing agents can also be used as activator when used in combination with reduced dyes.

Preferred Indicator:

Acids, bases and salts can be used as activators and hence if desired their reaction can be monitored with pH, cation and anion sensitive dyes. For example, bromophenol blue when exposed to a base, such as sodium hydroxide turns blue. When blue-colored bromophenol blue is exposed to acids, such as acetic acid it will undergo a series of color changes, such as blue to green to green-yellow to yellow. Aluminum ion reacts with alizarins to give a red precipitate; copper ions react with cuproine to give a pink purple color, ferrous ion gives a red color with 2,2'-dipyridyl, ferric ion reacts with potassium ferrocyanide to give a blue color, magnesium ion gives a blue color with magnesium and nickel ion reacts with dimethylglyoxime to give a red color. Test methods are also well known for the detection of inorganic compounds, their cations and anions, which are associated with a color change. These reactions and corresponding compounds can also be used in the device, especially if a color change is also desired. Inorganic compounds and indicators for their detection are described in references: J. Bassett, R. C. Denney, G. H. Jeffery and J. Mendham, Vogel's Textbook of Quantitative Inorganic Analysis, Longman Scientific and Technical, p. 294, 1986.; Fritz Feigl, Vinzenz Anger and Ralph E. Oesper, Spot Test in Inorganic Analysis, Elsevier Publishing Company, 1972, p. 526-616; Products for Analysis, Catalog of Hach Company, 1986-87 (are cited as references herein).

Indicators are typically dyes or compounds which react with activators to introduce a color change can be used as indicators. These are typically pH dyes. The preferred material is a colored dye which becomes colorless when contacted with the activator or vice versa. The reaction between the activation indicator and the activator should preferably occur fast in seconds to minutes.

A large number of reactions are associated with a change in fluorescence rather than a color change in the visible region. Such compounds can be used as indicator. All colors herein can also be fluorescence colors as well.

A list of indicator dyes that can be used are listed in Tables 1-3 of U.S. Pat. No. 5,053,339.

Selectivity:

In case of non-selective pairs of indicators and activators, an activator reacts with a large number of indicators and vice versa. For example, in case of a pH dye as a non-selective indicator, a numbers of activators, e.g., acids or amines can change the color of the pH dye and vice versa. In addition to non-selective pairs of indicators and activators, this invention also comprises selective pairs of indicators and activators. Many classes of compounds react selectively only with certain small number of compounds. For example, a chelate will react only with certain metal ions and vice versa to produce color metal chelate complexes. Indicators which selective react with a small number of activators and vice versa are referred pairs of indicators and activators. Further preferred selective pairs of indicators and activators are chelates and metals ions or metal complexes. Still further preferred selective pairs of indicators and activators are chelates which reacts with low toxicity metals, such as iron, for example a pair of 1,10-phenanthroline and iron chloride or iron acetate.

Chelates as Activators:

The activator can be a chelating or complexing agents. The choice of chelating or complexing agents will depend on metal atom (either as a salt or complex) used in indicator layer. Examples of chelating or complexing agents include, carbonyl compounds (e.g., acetylacetonates), simple carboxylates (e.g., acetates, aryl carboxylates), carboxylates containing one or more hydroxyl groups (e.g., glycolates, lactates, gluconates, gallic acid and salts thereof), di-, tri-, and poly-carboxylates (e.g., oxalates, phthalates, citrates, succinates, tartarates, malates, edetates (e.g., dipotassium EDTA), mixtures thereof), carboxylates containing one or more sulfonic and/or phosphonic groups, and the like. Suitable chelating or complexing agents also can include, for example, di-, tri-, or polyalcohols (e.g., ethylene glycol, pyrocatechol, pyrogallol, tannic acid) and amine-containing compounds (e g , ammonia, amino acids, amino alcohols, di-, tri-, and polyamines).

Other examples of chelating agents include trisodium pyrophosphate, tetrasodium diphosphate, sodium hexametaphosphate, sodium trimetaphosphate, sodium tripolyphosphate, potassium tripolyphosphate, phosphonic acid, di-phosphonic acid compound, tri-phosphonic acid compound, and a salt of a phosphonic acid compound, ethylene diamine-tetra-acetic acid, gluconate, or another ligand-forming compound. The chelating agents also include phosphonic acid-based chelating agents, such as aminotri(methyl-enephosphonic acid), 1-hydroxyethylidene-1,1-diphosphonic acid and ethylenediaminetetramethylenephosphonic acid; aminocarboxylate-based chelating agents, such as ethylenediaminetetraacetates and nitrilotriacetates; hydroxyaminocarboxylate-based chelating agents, such as dihydroxyethylglycine; or mixtures thereof.

Still further examples of chelating agents include amino acids, such as glycine, serine, proline, leucine, alanine, asparagine, aspartic acid, glutamine, valine, lysine, etc.; polyamine complexes and their salts, including ethylenediaminetetraacetic acid, N-hydroxyethylethylenediaminetriacetic acid, nitrilotriacetic acid, iminodiacetic acid, diethylenetriaminepentaacetic acid, and ethanoldiglycinate; polycarboxylic acids, including phthalic acid, oxalic acid, malic acid, succinic acid, mandelic acid, mellitic acid; alkali metal or ammonium salts of acetic acid, citric acid, tartaric acid, gluconic acid, lactic acid, propionic acid, or mixtures thereof.

Compounds which React with Ferrous and Ferric Salts and Organo-Iron Compounds:

Iron compounds are preferred indicators. Some example of compounds which react with ferrous and ferric salts and organo-iron compounds include ammonium ferrocyanide (II) hydrate, ammonium iron (III) oxylate hydrate, ammonium iron (III) sulfate hexahydrate, ammonium iron (III) sulfate dodecahydrate, ammonium thiocyanate, ammonium thiosulfate, aluminum chloride hexahydrate, luminum nitrate nonahydrate, copper (II) acetate monohydrate, copper (II) bromide, copper (II) chloride hydrate, copper (II) sulfate pentahydrate, ferrocene, iron (II) sulfate heptahydrate, nickel (II) chloride, sodium diethyldithiocarbamate trihydrate, sodium iodide, sodium thiosulfate pentahydrate, tin (II) bromide, tin (II) 2-ethylhexanoate, zinc acetylacetonate hydrate, zinc bromide and zinc chloride.

Organic Compounds which React with Ferrous and Ferric Salts and Organo-Iron Compounds:

Some examples of organic compounds which react with ferrous and ferric salts and organo-iron compounds includes fast orange base GC, 2-amino-p-cresol, benzenesulfonic acid, tert-butylhydroquinone, 2,6-di-tert-butyl-4-methylphenol, diphenylamine, diazoaminobenzene, hydroquinonesulfonic acid potassium salt, DL-malic acid, mandelic acid, methylhydroquinone, octadecylamine, trimethylhydroquinone, and 2,3,4-trihydroxybenzophenone.

Precursor:

Precursors for activators are the materials which don't react or react very slowly with an indicator but produce activator for the indicator when subjected to a process or an agent. Precursors for activators are often referred to as simply as precursors, irrespective of a process, an agent or a device. Creation, coating, printing, layer and alike of a precursor will be essentially similar to that of the activator. Like an activator, a precursor can be printed on the indicator layer or on any other layer, such as a permeable barrier.

Sometimes there is no sharp line of demarcation between a precursor and an activator. Many of the acids, bases and salts listed herein can also be precursor under certain circumstances. It is also possible that (1) a reactant may produce a precursor which may need another reactant or precursor to produce an activator, (2) two precursors may react to produce an activator, (3) a precursor may undergo more than one reaction to produce an activator and/or may need (4) a catalyst and alike to produce an activator. Phosphorus, white and yellow phosphorus in particular is an example. White phosphorus reacts with oxygen to produce phosphorus oxide which reacts with water to produce phosphoric acid which is an activator. Thus, phosphorus is not a direct precursor but reacts with oxygen and water, to produce an activator. Thus white phosphorus can be used as precursor for monitoring oxygen, phosphorous pentoxide for monitoring humidity and phosphoric acid for monitoring time and time-temperature. A precursor or activator and a device made from it can be used for multi-purpose, i.e., for monitoring more than one processes and/or agents as well.

Depending upon the need, application and situation, an activator can be replaced with its precursor. For example, for sterilization with ethylene oxide and hydrogen peroxide, one can use precursors, such as sodium thiocyanate and tetrabutylammonium bromide respectively. Sodium thiocyanate when reacts with ethylene oxide produces sodium hydroxide which can react with indicator layer. Similarly, tetrabutylammonium bromide can react with oxidizing agents, such as hydrogen peroxide or its plasma to produce an acid, such as hydrobromous acid which can also react with indicator layer.

Controller:

A controller can be a material which controls the reactivity and activation energy of the system, including accelerator, retarder, moderator, catalysts, plasticizer, diluents and other additives/adjuvants.

Accelerators:

Accelerators are compositions which can increase diffusion of activator and/or indicator through the binder or the barrier layer. They can be used to increase the speed of diffusion of the activator. They can also change the activation energy of the system. Accelerator can be in any layer, preferably in the activator layer. Accelerator can be a solvent, preferably high boiling and a plasticizer. Accelerator can also be solid compounds which diffuse through the binders including permeable barrier. Compounds which sublime can also increase the speed of the diffusion of activator.

High boiling and solid solvents which can dissolve an activator can be used to facilitate migration of activator. If required, a solvent can be used for a solid activator. High boiling solvents, such as cinnamoyl alcohol, xylenol, phenolethanol, diphenylether and a large number of other organic and inorganic compounds can be used as solvents for activators.

We have observed that often solvents expedite the diffusion of the activator and reaction with the indicators.

Solvents or liquids as aids, facilitator, promotors to migration of activator useful in the invention devices includes the following: water, $C_1$-$C_{15}$ aliphatic, aromatic and substituted aliphatic and aromatic amides preferably acetamide, dimethylformamide and chloroacetamide; alcohols, preferably amyl alcohol, hexyl alcohol, and dichloropropanol; esters, preferably methylpropionate, amylformate, diethyl maleate, ethylene glycol diacetate, ethylsalicylate, and triacetin; nitroalkanes preferably nitropropane; aldehydes, preferably butyraldehyde; carbonates, preferably diethylcarbonate and propylene carbonate; aromatic alcohols/phenols, preferably dihydroxy benzene, benzyl alcohol and phenol; amines, preferably diethanolamine, dimethylpyridine and cyclohexane diamine; ether-esters preferably ethoxyethylacetate, trioxane, tetraethylene glycol dimethylether, benzyl ether, phenylether, propylene glycol ethylether acetate and propylene glycol butylether; alcohol-esters, preferably ethylene glycol monoacetate; acids, preferably glutaric acid, isobutyric acid, mandelic acid, and toluene sulfonic acid; ketones, preferably methylethylketone and hydroxyacetophenone; ketone-esters, preferably methylacetoacetate; lactones, preferably propiolactone and butyrolactone, methylpyrrolidone and mixture thereof. One can use more than one activator solvent in varying proportions. One may use additives, such as co-solvents (especially highly polar organic solvents, such as alcohols, acids and amines and ethers) surfactants and nucleating agents. Many of these solvents can also be used as a wetter.

Specific examples of solvents include butoxy-2-ethylstearate, butyrolactone, diethyl fumarate, dimethyl maleate, dimethylcarbonate, dioctyl phthalate, ethylene glycol dimethyl ether, ethyl salicylate, polyethylene glycol dimethylether, propylene carbonate, triacetin, benzyl ether, dodecyl-1,2-methyl pyrrolidone, ethoxyethylacetate, ethylene glycol diacetate, ethyltrichloroacetate, methylpyrrolidone, methyl sulfoxide, polyethylene glycols of different molecular weight, dimethylformamide, cyclohexane, p-dioxane, tetrahydrofuran, p-xylene, acetone, 2-butanone, ethyl acetate, propyl acetate, toluene, xylene and hexane. Many of these solvents can also be used as a wetter.

Plasticization:

Nature (hardness or softness) of a binder is a major rate determining factor for the color change and the Ea. Hardness of a binder can depend on nature of the binder, molecular weight, crosslinking and plasticization. Higher the plasticization, faster the color development. The time required for the color development can be varied from hours to years at room temperature by selecting proper plasticizer for the binders.

Plasticizers as Accelerators:

Plasticizers are preferred class of accelerator. They include sebacates, adipates, terephthalates, dibenzoates, gluterates, phthalates, azelates, and other specialty blends. Dicarboxylic/tricarboxylic ester-based plasticizers such as bis(2-ethylhexyl) phthalate, diisononyl phthalate, di-n-butyl phthalate, butyl benzyl phthalate, diisodecyl phthalate, di-n-octyl phthalate, diisooctyl phthalate, diethyl phthalate, diisobutyl phthalate, di-n-hexyl phthalate, trimellitates, such as trimethyl trimellitate, tri-(2-ethylhexyl) trimellitate, tri-(n-octyl, n-decyl) trimellitate, tri-(heptyl, nonyl) trimellitate and n-octyl trimellitate, adipates, such as bis(2-ethylhexyl) adipate, dimethyl adipate, monomethyl adipate and dioctyl adipate, sebacates, such as dibutyl sebacate, maleates, such as dibutyl maleate and diisobutyl maleate, benzoates, phthalates, such as dioctyl terephthalate, and others, such as 1,2-cyclohexane dicarboxylic acid diisononyl ester, epoxidized vegetable oils, alkyl sulphonic acid phenyl ester, sulfonamides, such as N-ethyl toluene sulfonamide, N-(2-hydroxypropyl) benzene sulfonamide, N-(n-butyl) benzene sulfonamide, organophosphates, such as tricresyl phosphate and tributyl phosphate, glycols/polyethers, such as triethylene glycol dihexanoate and tetraethylene glycol diheptanoate, polymeric plasticizers, such as polybutene, biodegradable plasticizers, such as acetylated monoglycerides, alkyl citrates, triethyl citrate, acetyl triethyl citrate, tributyl citrate, acetyl tributyl citrate, trioctyl citrate, acetyl trioctyl citrate, trihexyl citrate (THC), acetyl trihexyl citrate, butyryl trihexyl citrate, trihexyl o-butyryl citrate, and trimethyl citrate.

Other Reactions/Processes that can be Used:

The indicting devices based on processes other than diffusion, such as degradation, polymerization, depolymerization, decomposition, conversion, complexation, halogenation, dehydrohalogenation, precipitation, catalytic reaction, synthesis, displacement, acid-base, oxidation-reduction, neutralization, condensation, isomerization, hydrolysis, addition, elimination, substitution, rearrangement, adsorption-desorption, oxidation-reduction, redox reactions, gelling, swelling, change in viscosity or hardness, density/specific gravity and solubility can also be used. These are some of the processes that can be used for varying the effect of temperature or controlling the rate of the reaction and the activation energy.

Particle Size:

The size of the solid reactant particles could be from nanometers to many microns. The fine particles of the reactants can be obtained by many processes, such as conventional methods of milling solids, heating in a medium to dissolve at high temperature and cooling, especially by rapid cooling, by known methods of making nano and micron sized particles.

Varying Time and Activation Energy:

The service life (e.g., time required for a color change) and the activation energy of the current indicating devices can be varied by one or more of the following major parameters:

The service life of the devices can be changed by parameters, such as thickness of layer/binder, thickness of a permeable barrier layer if used, quantity or concentration of an activator and co-activator, concentration of an indicator and co-indicator, concentration of accelerator, concentration of a precursor, and concentration of additive.

The service life and activation energy of the devices can be change by parameters, such as nature of a binder of layers, nature of an activator, nature of an indicator, nature of accelerator, nature of a permeable layer, and nature of an additive.

Preferred Ranges:

The devices can be made with service life of hours to years. Preferred service life is 1 to 30 days. The devices can be made to operate from −40° C. to 200° C. The preferred temperature range is −20° C. to 60° C. The concentration of activator can be varied from a 1 to 95%. Preferred concentration of activator is 5-50%. The concentrations of accelerator can be varied from a 1 to 50%. Preferred concentration is 5-20%. The quantity of activator used can vary from 0.1 mg-1 g per device depending upon the size of the device, preferred weight is 1-10 mg. The thickness of indicator layer can be from a 10 nm to 0.1 mm, preferred thickness is 10 to 100 microns, the thickness of substrates can be from 10 microns to 1 mm, preferred thickness is 10-100 microns. The activation energy of the devices can be varied from essentially zero kcal/mole to about 100 kcal/mole, preferred ranges are 20 to 30 kcal/mole for time-temperature indicating devices, 40-100 kcal/mole for steam sterilization indicator and 0-15 kcal for time indicating devices.

RELATED PROPERTIES

Eliminating Undesirable Effect of Ambient Conditions:

In order to avoid effect of undesirable, adverse effects of ambient conditions, such as humidity, oxygen, carbon dioxide and UV light, one may select materials for the devices which are either not affected by them or protect them. If the materials are humidity sensitive, the effect can be minimized by selecting barrier films which minimize the diffusion of humidity in the devices. If the materials are UV sensitive, one can add UV absorbers in the system and/or select substrates which are UV absorbing. Similarly, if a material diffuses out of the substrate, one can select a substrate, such as high barrier films as substrate and the system can be sealed from all sides.

Induction Period:

The system can have an induction period to begin with as it takes time for an activator to travel/diffuse and reach the indicator and develop faint color. An induction period can be further introduced by adding a neutralizer for one of the reactants. If the activator is an acid one can add a base as a neutralizer to introduce an induction period and vice versa. One can select a pH dye having a lower pH color transition for acids and higher pH color transition for basic activator. For chelate-metal pair one can select another weaker chelate as a neutralizer.

Online Activation:

The coating formulations can be coated online, one formulation followed by the other and final coat of a barrier coat by a method, such as inkjet method and UV curing at every stage or if the reaction between reactants is slow then UV curing one coating containing all reactants. For making the indicating devices online, one can also use very fine, nano to micron sized particles of reactants in a binder to prepare an ink for inkjet printing and inkjet ink with other ingredients and coat or write with inkjet or other similar printing or coating techniques.

Advantages of the Invention:

In addition to advantages mentioned above, the indicating devices disclosed herein offer many advantages including:

Devices can be prepared at very high speed.
Devices can be prepared by coating all layers on one substrate.
No lamination of two tapes is required.
Paper thin and small moving boundary devices can be created.
Devices are thin and can be prepared directly on the label.
They are essentially solid state devices and if a liquid is used it is very little.
They are easy to manufacture and would be significantly less expensive.
By selecting proper ingredients, the devices can be made essentially unaffected by undesirable ambient conditions, such as humidity and UV light.
The devices can be made by using commercially available printing and coating equipment.
The service life of the devices can be varied from hours to years.
There is a very wide choice of materials which are commercially available to make the devices.
The devices can be sufficiently small (a few mm to a few cm) to apply on caps of any small perishable, such as vaccine vials and syringes.
Essentially any color and color changing devices are possible by selecting proper indicator—activator pairs.
There are many non-toxic activators, indicators and binders that can be used for the devices.
Threshold TTI can be made by selecting an activator having proper melting point.
It is easier to make reproducible devices.
Any large size devices can be made.
Self-reading devices can be made.
Two messages, Go/No-Go type devices can also be made.
Devices with induction period can be made.
Using tamper evident films as a substrate, one can make the devices tamper evident (i.e., if peeled from the container, it will be evident). Breakable plastic films can be used as substrates to make tamper evident devices.
These devices will be significantly less expensive in material, equipment, space, labor and overhead.
By permutation—combination it is possible to have a large number of variations, modifications and options for the devices and processes, e.g., by changing properties of components, position of a layer, multiplicity of a layer, adding an extra layer, changing nature of additives, activators, indicator, binder, adding image/message, by varying the size and shape of a layer or the device, varying nature of the materials, and many other parameters including those mentioned in this application.

EXAMPLES

Example 1: Making of a UV Cured Multilayer TTI Device 1.1 Indicator layer: 0.1 g of ferric acetylacetonate was dissolved in 25 g of a UV ink varnish (UVF0-2255 of FlintGroup, Montréal, Canada) and heated to dissolve ferric acetylacetonate. The solution was coated on 40 micron polyester film to obtain 25 micron coating. The coating was exposed to a 254 nm short wavelength UV light at 5 cm distance for two minutes to cure the coating.

1.2 Permeable barrier layer: The above cured indicator layer was top coated with 25 micron thick layer with UV ink varnish (UVF0-2255) and UV cured.

1.3 Activator layer: A 25 micron thick layer of activator ink mixture (0.5 g propyl gallate dissolved in 5 g of UV curable PSA (CraigCoat 1029J UV high tack PSA) was coated over the barrier layer and UV cured.

1.4 Protective layer: The activator layer was laminated with 40 micron polyester film. The TTI film device appear faint yellow. The film device was cut into small pieces to make small TTI devices.

1.5 Effect of time and temperature: Pieces of the indicating devices were annealed at different temperature for different periods of time. The devices developed purple color and the color intensified with time and temperature. FIG. 4 shows color of UV cured multilayer device annealed at room temperature and at 50° C. for 12 hours.

Similar devices were prepared using quinolinol as an activator.

Example 2 Making of a Single Layer TTI

2a. Making of activator ink formulation: In a 100 ml jar containing 30 g of Covinax 258-10 (a water based PSA latex of Franklin Polymers and Adhesives, Columbus, Ohio) was added 2.5 g 2,3-dihydroxy naphthalene (DN) dissolved in 5 ml of hot (80° C.) THF (tetrahydrofuran) under high homogenization and cooled under stirring to room temperature. THF was removed under vacuum. Similar coating formulation was made by adding finely milled 2,3-dihydroxynaphthalene in Covinax 258-10.

2b. Making of indicator ink formulation: In a 250 g ml jar containing 100 g of Covinax 258-10 (a water based PSA latex) was added 2 g of finely ball milled iron stearate under high homogenization.

2c. Making of coating formulation: Cold (~10° C.) dispersions of 2a and 2b were mixed under stirring. The mixture was kept cold till coated.

2d. Making of the single layer TTI: The mixture of 2c was coated on a ~40 micron polyester film with a 2 mil bar and dried in an oven at 50° C. for 15 minutes. The coating was laminated with a ~40 micron clear polyester film. In order to study effect of concentration, the formulation of 2c was diluted with Covinax 258-10 and coated the same way.

2e. Testing of the TTI device: Small rectangle strips were cut from the TTI of 2d and annealed at ~70° C., 45° C. and at room temperature for different period of time.

The results are shown in FIG. 7. The colorless coatings developed purple color and the color intensified with time and temperature of annealing. Though the color development depends on time and temperature of annealing, there is very little effect of dilution/concentration of the activator and indicator by four folds.

Indicator ink formulations similar to that of 2c were coated and dried to get TTI devices having different thicknesses, such as 0.2, 0.5, 1 and 2 mil of the indicating layer. We also observed that the color development is also substantially independent of the thickness after a certain thickness of the indicating layer. The independence of color development on the thickness of the indicating layer after a certain thickness is mainly because the activator and the indicator particles were substantially opaque and once the indicating layer become substantially opaque, further thickness does not make the indicating layer more opaque and hence the color development becomes independent of the thickness.

This substantial independence of color development with time and temperature on thickness of the indicating layer is highly desirable, unique and novel for an indicating device, such as TTI and is the most preferred embodiment of this invention.

The invention claimed is:

1. A method of making a composite time-temperature indicating device by:
(i) applying an indicator layer comprised of at least one UV curable binder and at least one indicator to a substrate;
(ii) curing the UV curable binder of the indicator layer with UV light to form a cured indicator layer;
(iii) applying an activator layer comprised of at least one UV curable binder and at least one activator on the indicator layer wherein said activator can react with said indicator after an induction period;
(iv) curing the activator layer with UV light after said applying said activator layer on said indicator layer to form a cured activator layer;
(v) applying a UV curable protective layer on the cured activator layer; and
(vi) UV curing the protective layer.

2. The method of making time-temperature indicating device of claim 1 by applying and UV curing a permeable barrier layer between the indicator layer and the activator layer.

3. A method of making a composite time-temperature indicating device by:
applying an indicator layer comprised of at least one UV curable binder and at least one indicator to a substrate;
applying an activator layer comprising at least one UV curable binder and at least one activator to the indicator layer wherein said activator can react with said indicator after an induction period
curing the activator layer and the indicator layer with UV light;
applying a UV curable protective layer on the cured activator layer; and
UV curing the protective layer.

4. A time-temperature indicating device comprised of a substrate having thereon:
(i) an indicator layer comprised of at least one UV cured binder and at least one indicator;
ii) an activator layer comprised of at least one UV cured binder and at least one activator cured onto said indicator layer wherein said activator can react with said indicator after an induction period; and
(iii) a protective layer.

5. The device of claim 4 having a UV cured permeable layer between the indicator layer and the activator layer.

6. The device of claim 4 further comprising a permeable layer between the indicator layer and the activator layer wherein the indicator layer, the activator layer and the permeable layer further comprise at least one controller that controls the reaction between the indicator and the activator in one of the layers.

7. The device of claim 4 further comprising a permeable layer between the indicator layer and the activator layer and a controller wherein the time required for a color change or service life is varied by varying one or more parameters selected from thickness of the UV curable binder of the activator layer, thickness of the permeable layer, concentration of the activator, concentration of the indicator and concentration of the controller.

8. The device of claim 4 further comprising a permeable layer between the indicator layer and the activator layer and a controller and a controller wherein the activation energy of the device is varied by varying one or more parameters selected from nature of the UV curable binder of the activator layer, nature of the activator, nature of the indicator, nature of a controller and nature of the permeable layer.

9. The device of claim 4 wherein the time required for a color change or service life is varied by varying one or more parameters selected from thickness of the UV curable binder of the activator layer, concentration of the activator, concentration of the indicator and concentration of a controller.

10. The device of claim 4 wherein an activation energy of the device is varied by varying one or more parameters selected from nature of the UV curable binder of the activator layer, nature of the activator, nature of the indicator and nature of a controller.

11. The device of claim 4 comprising at least one substantially opaque reactant in the indicator layer.

12. The indicating device of claim 11 wherein the substantially opaque reactant is a substantially opaque solid activator, a substantially opaque solid indicator or both activator and indicators comprise the substantial opaque solid.

13. A time-temperature indicating device comprised of a substrate having thereon a layer comprising a UV cured binder comprising solid particles of an indicator in an indicator layer and solid particles of an activator in an activator layer wherein said activator layer is cured onto said indicator layer and wherein said activator can react with said indicator after an induction period.

14. A time-temperature indicating device comprised of a substrate having thereon:
   (i) an indicator layer comprised of at least one UV cured binder and at least one indicator;
   (ii) a permeable layer cured onto said indicator layer;
   (iii) an activator layer comprised of at least one UV cured binder and at least one activator cured onto said permeable layer wherein said activator can react with said indicator after an induction period; and
   (iv) a protective layer cured on said activator layer.

15. A time-temperature indicating device comprised of a substrate having thereon:
   (i) an indicator layer comprising at least one UV cured binder and at least one indicator and a permeable layer;
   (ii) an activator layer comprised of at least one UV cured binder and at least one activator cured onto said permeable layer wherein said activator can react with said indicator after an induction period; and
   (iii) a protective layer cured onto said activator layer.

* * * * *